United States Patent
Miyata et al.

(10) Patent No.: US 7,014,588 B2
(45) Date of Patent: Mar. 21, 2006

(54) TOROIDAL-TYPE CONTINUOUSLY VARIABLE TRANSMISSION AND CONTINUOUSLY VARIABLE TRANSMISSION APPARATUS

(75) Inventors: Shinji Miyata, Kanagawa (JP); Masami Tanaka, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/217,543

(22) Filed: Aug. 14, 2002

(65) Prior Publication Data
US 2003/0036454 A1 Feb. 20, 2003

(30) Foreign Application Priority Data
Aug. 16, 2001 (JP) .......................... P. 2001-246864

(51) Int. Cl.
F16H 37/02 (2006.01)
F16H 13/38 (2006.01)
(52) U.S. Cl. ........................................ 475/214; 476/42
(58) Field of Classification Search ............ 475/214–6, 475/216; 476/40, 42
See application file for complete search history.

(56) References Cited

U.S. PATENT DOCUMENTS

| | | | | |
|---|---|---|---|---|
| 2,123,007 | A * | 7/1938 | Hayes | 476/40 |
| 4,893,517 | A * | 1/1990 | Nakano | 476/40 |
| 5,048,359 | A | 9/1991 | Nakano | |
| 5,232,414 | A | 8/1993 | Fellows et al. | |
| 5,584,778 | A * | 12/1996 | Machida et al. | 476/46 |
| 5,599,252 | A * | 2/1997 | Fukushima | 476/42 |
| 5,888,160 | A | 3/1999 | Miyata et al. | |
| 6,171,210 | B1 | 1/2001 | Miyata et al. | |
| 6,213,907 | B1 * | 4/2001 | Wooden | 476/40 |
| 6,375,595 | B1 * | 4/2002 | Machida et al. | 476/42 |
| 6,547,690 | B1 * | 4/2003 | Kuhn et al. | 476/42 |
| 6,740,001 | B1 * | 5/2004 | Ishikawa et al. | 476/42 |
| 2001/0003108 | A1 | 6/2001 | Goi et al. | |
| 2002/0032095 | A1 | 3/2002 | Miyata et al. | |

FOREIGN PATENT DOCUMENTS

| | | |
|---|---|---|
| JP | 62-71465 | 5/1987 |
| JP | 1-169169 | 7/1989 |
| JP | 1-37249 | 11/1989 |
| JP | 1-173552 | 12/1989 |
| JP | 1/312266 | 12/1989 |
| JP | 3-74667 | 3/1991 |
| JP | 6-37223 | 9/1994 |
| JP | 10-196759 | 7/1998 |
| JP | 11-63146 | 3/1999 |
| JP | 11-63147 | 3/1999 |
| JP | 11-108149 | 4/1999 |
| JP | 11-280867 | 10/1999 |
| JP | 11-303961 | 11/1999 |

(Continued)

OTHER PUBLICATIONS

Abstract of GB 2 256 015, dated Nov. 25, 1992.

*Primary Examiner*—Roger Pang
(74) *Attorney, Agent, or Firm*—Sughrue Mion, PLLC

(57) ABSTRACT

A plurality of projecting portions are provided on and projected from part of an outer peripheral surface of an input side disk. A plurality of transmitting projection pieces are provided on a base end portion of a transmission shaft. The transmitting projection pieces of the transmission shaft are engaged with the projecting portions of the input side disk to thereby be able to transmit torque between the input side disk and the transmission shaft.

9 Claims, 12 Drawing Sheets

FOREIGN PATENT DOCUMENTS

| | | |
|---|---|---|
| JP | 2001-158400 | 6/2001 |
| JP | 2001-329948 | 11/2001 |
| JP | 2002-5258 | 1/2002 |
| JP | 2002-31206 | 1/2002 |

* cited by examiner

FIG.1

TOROIDAL-TYPE CONTINUOUSLY VARIABLE TRANSMISSION AND CONTINUOUSLY VARIABLE TRANSMISSION APPARATUS

BACKGROUND OF THE INVENTION

1. Field of the Invention

The present invention relates to a toroidal-type continuously variable transmission and a continuously variable transmission apparatus which can be used as a transmission unit constituting an automatic transmission apparatus for a vehicle or a transmission for controlling the operating speed of various industrial machines such as a pump.

2. Description of the Related Art

It is has been studied to use such a toroidal-type continuously variable transmission as shown in FIGS. 8 and 9 as a transmission for a vehicle, and such use of the toroidal-type continuously variable transmission has been enforced in part of the vehicle industry. In this toroidal-type continuously variable transmission, for example, as disclosed in JP-62-71465U, an input side disk 2 is supported concentrically with an input shaft 1 and an output side disk 4 is fixed to the end portion of an output shaft 3 disposed concentrically with the input shaft 1. Inside a casing 5 (see FIG. 11 which will be discussed later) in which the toroidal-type continuously variable transmission is stored, there are disposed trunnions 7, 7 which can be swung about pivot shafts 6, 6 disposed at positions twisted with respect to the input shaft 1 and output shaft 3.

Specifically, a pair of pivot shafts 6, 6 are disposed on the outer surfaces of the two end portions of each of the trunnions 7 in such a manner that the two pivot shafts 6, 6 are concentric with each other. The center axes of the pivot shafts 6, 6 do not intersect with the center axes of the input side and output side disks 2, 4 but are present at twisted positions which exist in directions almost at right angles to the directions of the center axes of the input side and output side disks 2, 4. Also, on the central portions of the respective trunnions 7, 7, there are supported the base half sections of displacement shafts 8, 8. In case where the trunnions 7, 7 are respectively swung about their associated pivot shafts 6, 6, the inclination angles of the displacement shafts 8, 8 can be adjusted. On the peripheries of the front half sections of the displacement shafts 8, 8 supported on the trunnions 7, 7, there are supported power rollers 9, 9 in such a manner that they can be rotated. And, the power rollers 9, 9 are held by and between the inner surfaces 2a, 4a of the input side and output side disks 2, 4.

The sections of the mutually opposing inner surfaces 2a, 4a of the input side and output side disks 2, 4 are respectively formed in a concave surface having an arc-shaped section, while the concave surface can be obtained by rotating an arc having the pivot shaft 6 as a center thereof or by rotating a curved line close to such arc. And, the peripheral surfaces 9a, 9a of the power rollers 9, 9 each formed in a spherically convex surface are respectively contacted with the inner surfaces 2a, 4a of the input side and output side disks 2, 4. Also, between the input shaft 1 and input side disk 2, there is interposed a loading cam device 10. The input side disk 2 can be rotated by the loading cam device 10 while it is elastically pressed toward the output side 4 by the cam loading device 10

When the above-structured toroidal-type continuously variable transmission is in use, as the input shaft 1 is rotated, the loading cam device 10 rotates the input side disk 2 while pressing the input side disk 2 against the plurality of power rollers 9, 9. And, the rotational movement of the input side disk 2 is transmitted through the plurality of power rollers 9, 9 to the output side disk 4, so that the output shaft 3 fixed to the output side disk 4 can be rotated.

When changing the rotation speed between the input shaft 1 and output shaft 3, firstly, to reduce the rotation speed between the input shaft 1 and output shaft 3, the trunnions 7, 7 may be swung about the pivot shafts 6, 6 and the displacement shaft 8, 8 may be inclined in such a manner that the peripheral surfaces 9a, 9a of the power rollers 9, 9, as shown in FIG. 8, can be respectively contacted with the near-to-center portion of the inner surface 2a of the input side disk 2 and the near-to-outer-periphery portion of the inner surface 4a of the output side disk 4.

On the other hand, to increase the rotation speed between the input shaft 1 and output shaft 3, the trunnions 7, 7 may be swung and the displacement shaft 8, 8 may be inclined in such a manner that the peripheral surfaces 9a, 9a of the power rollers 9, 9, as shown in FIG. 9, can be respectively contacted with the near-to-outer-periphery portion of the inner surface 2a of the input side disk 2 and the near-to-center portion of the inner surface 4a of the output side disk 4. In case where the inclination angles of the displacement shafts 8, 8 are set intermediate between FIGS. 8 and 9, an intermediate transmission ratio can be obtained between the input shaft 1 and output shaft 3.

Further, FIGS. 10 and 11 show a more specified toroidal-type continuously variable transmission which is disclosed in JP-A-1-173552U. In this toroidal-type continuously variable transmission, an input side disk 2 and an output side disk 4 are respectively supported on the periphery of a circular-pipe-shaped input shaft 11 in such a manner that they can be rotated. Also, between the end portion of the input shaft 11 and input side disk 2, there is interposed a loading cam device 10. On the other hand, an output gear 12 is coupled to the output side disk 4 in such a manner that the output side disk 4 and output gear 12 can be rotated synchronously.

Pivot shafts 6, 6, which are disposed on the two end portions of each of a pair of trunnions 7, 7 in such a manner that the pivots 6, 6 are concentric with each other, are supported on their associated pair of support plates 13, 13 in such a manner that they can be swung as well as can be displaced in the axial direction thereof (that is, in FIG. 10, in the front and back direction of the figure sheet; and, in FIG. 11, in the right and left direction). And, on the intermediate portions of the respective trunnions 7, 7, there are supported the base half sections of the displacement shafts 8, 8. Each of the displacement shafts 8, 8 is structured such that the base halt section thereof and the front half section thereof are eccentric to each other. And, the base half sections of the displacement shafts 8, 8 are rotatably supported on the intermediate portions of their associated trunnions 7, 7, while the power rollers 9, 9 are rotatably supported on the front half sections of the displacement shafts 8, 8.

By the way, the pair of displacement shafts 8, 8 are disposed at positions 180° opposite to the input shaft 11. Also, the eccentric direction between the base half sections and front half sections of the displacement shafts 8, 8 is the same direction (in FIG. 11, the reversed right and left direction) with respect to the rotation direction of the input side and output side disks 2, 4. Further, the eccentric direction is a direction extending almost at right angles to the arrangement direction of the input shaft 11. Therefore, the power rollers 9, 9 are supported in such a manner that they can be displaced slightly with respect to the arrangement direction of the input shaft 11.

Also, between the outer surfaces of the power rollers 9, 9 and the inner surfaces of the intermediate portions of the trunnions 7, 7, there are disposed thrust ball bearings 14, 14 and thrust needle roller bearings 15, 15 in the order starting from the outer surfaces of the power rollers 9, 9. The thrust ball bearings 14, 14, while supporting thrust-direction loads applied to the power rollers 9, 9, allow the power roller 9, 9 to rotate. Also, the thrust needle roller bearings 15, 15, while supporting thrust loads applied from the power rollers 9, 9 to outer races 16, 16 forming the thrust ball bearings 14, 14, allow the front half sections of the displacement shafts 8, 8 and the outer races 16, 16 to be swung about the base half sections of the displacement shafts 8, 8. Further, the trunnions 7, 7 can be displaced in the axial direction thereof by actuators 17, 17 each of an oil pressure type.

In the case of the above-structured toroidal-type continuously variable transmission, the rotational movement of the input shaft 11 is transmitted through the loading cam device 10 to the input side disk 2. And, the rotational movement of the input side disk 2 is transmitted through a pair of power rollers 9, 9 to the output side disk 4 and further the rotational movement of the output side disk 4 is taken out by the output gear 12.

To change the rotation speed ratio between the input shaft 11 and output gear 12, the pair of trunnions 7, 7 maybe respectively displaced in the mutually opposite directions by their associated actuators 17, 17; for example, the power roller 9 shown on the lower side in FIG. 11 is displaced to the right in FIG. 11, whereas the power roller 9 shown on the upper side in FIG. 11 is displaced to the left in FIG. 11. This changes the direction of a tangential-direction force acting on the contact portions between the peripheral surfaces 9a, 9a of the power rollers 9, 9 and the inner surfaces 2a, 4a of the input side and output side disks 2, 4. And, due to such change in the direction of the tangential-direction force, the trunnions 7, 7 are swung in the mutually opposite directions about the pivot shafts 6, 6 which are pivotally supported on the support plates 13, 13. As a result of this, as shown in FIGS. 8 and 9 which have been previously discussed, the contact positions between the peripheral surfaces 9a, 9a of the power rollers 9, 9 and the inner surfaces 2a, 4a of the input side and output side disks 2, 4 are changed, thereby changing the rotation speed ratio between the input shaft 11 and output gear 12.

When transmitting the power by the toroidal-type continuously variable transmission, the power rollers 9, 9 are displaced in the axial direction of the input shaft 11 in accordance with the elastic deformation of the respective composing parts of the toroidal-type continuously variable transmission. And, the displacement shafts 8, 8 supporting the power rollers 9, 9 are slightly rotated about their respective base half sections. This slight rotation displaces the outer surfaces of the outer races 16, 16 of the thrust ball bearings 14, 14 and the inner surfaces of the trunnions 7, 7 with respect to each other. Between these outer and inner surfaces, there are interposed the thrust needle roller bearings 15, 15 and, therefore, such relative shift can be attained with a small force.

In the case of the above-structured toroidal-type continuously variable transmission, power transmission between the input shaft 11 and output gear 12 is carried out by the two power rollers 9, 9. Therefore, the-power per unit area to be transmitted between the peripheral surfaces 9a, 9a of the power rollers 9, 9 and the inner surfaces 2a, 4a of the input side and output side disks 2, 4 increases, which generates a limit on the power that can be transmitted. In view of this, in order to be able to increase the power that can be transmitted by the toroidal-type continuously variable transmission, in related art, it has also been proposed to increase the number of power rollers 9, 9.

As a first example of a structure for increasing the number of power rollers 9, 9 to accomplish the above purpose, in related art, there is known a structure in which, as disclosed in JP-A-3-74667, between a set of input side disk 2 and output side disk 4, there are interposed three power rollers 9, 9 and power is transmitted between the set of input side disk 2 and output side disk 4 by the three power rollers 9, 9. In the case of the structure disclosed in this publication, as shown in FIG. 12, at the three positions of a fixed frame 18 that are arranged at regular intervals in the circumferential direction of the fixed frame 18, there are pivotally supported the respective middle portions of three support pieces 19, 19 each of which is bent at an angle of 120°. And, between the mutually adjoining support pieces 19, 19, there are supported three trunnions 7, 7 in such a manner that they can be swung and can be displaced in the axial direction thereof.

Each of the three trunnions 7, 7 includes on the two end portions thereof two pivot shafts 6 which are concentric with each other. The trunnions 7, 7 can be displaced in the axial direction of their respective pivot shafts 6 by their respective actuators 17, 17 each of an oil pressure type. Three oil pressure cylinders 20, 20, which respectively constitute their associated actuators 17, 17, communicate through a control valve 21 with the jet-out opening of a pump 22 serving as an oil pressure source. This control vale 21 includes a sleeve 23 and a spool 24 which can be respectively displaced in the axial direction thereof (in FIG. 12, in the right and left direction).

To change the inclination angles of the power rollers 9, 9 respectively pivotally supported on their associated trunnions 7, 7 by their associated displacement shafts 8, 8, the sleeve 23 may be displaced in the axial direction thereof (in FIG. 12, in the right and left direction) by a control motor 25. Due to this, pressure oil jetted out from the pump 22 is supplied through pressure oil pipes into the respective oil pressure cylinders 20, 20. And, drive pistons 26, 26, which are respectively fitted into their associated oil pressure cylinders 20, 20 and are used to shift their associated trunnions 7, 7 in the axial direction of their respective pivot shafts, are displaced in the same directions with respect to the rotation direction of the input side and output side disks 2 and 4 (see FIGS. 8 and 9). Also, operation oil, which has been pushed out from the respective oil pressure cylinders 20, 20 with the displacement movements of the respective drive pistons 26, 26, is returned to an oil tank 27 through an oil pressure pipe (part of which is not shown) including the control valve 21.

On the other hand, the displacement movements of the respective drive pistons 26, 26 caused by the supply of the pressure oil are transmitted to the spool 24 through a precess cam 28 and a link 29, thereby displacing the spool 24 in the axial direction thereof. As a result of this, in a state where the drive piston 26 is displaced by a given amount, the flow passage of the control valve 21 is closed to thereby stop the supply and discharge of the pressure oil with respect to the oil pressure cylinders 20, 20. Therefore, the displacement amounts of the respective trunnions 7, 7 in the axial direction thereof can be set so as to correspond to the displacement amount of the sleeve 23 provided by the control motor 25.

Further, in order to be able to increase the power that can be transmitted by a toroidal-type continuously variable transmission, as a second example of a structure for increasing the number of power rollers 9, 9 to achieve the above purpose, in related art, there is also known a structure of a so called double-cavity type in which, as shown in FIG. 13, input side disks 2A, 2B and output side disks 4, 4 are disposed by twos on the periphery of an input shaft 11a and also these input side disks 2A, 2B and output side disks 4, 4 are arranged in parallel to each other in the power transmission direction. In the structure shown in FIG. 13, an output gear 12a is supported on the periphery of the middle portion of the input shaft 11a in such a manner that it can be rotated with respect to the input shaft 11a, while the output side disks 4, 4 are spline engaged with the two end portions of a cylindrical portion disposed in the central portion of the output gear 12a. Also, the input side disks 2A, 2B are supported on the two end portions of the input shaft 11a in such a manner that they can be rotated together with the input shaft 11a. The input shaft 11a can be driven or rotated by a drive shaft 100 through a loading cam device 10. In the case of the thus structured toroidal-type continuously variable transmission of a double cavity type, the power transmission from the input shaft 11a to the output gear 12a can be carried out through the following two routes; that is, one route between one input side disk 2A and one output side disk 4, the other between the other input side disk 2B and the other output side disk 4. Therefore, in this case, transmission of large power can be realized.

When incorporating the above structured toroidal-type continuously variable transmission into an actual continuously variable transmission for a vehicle, in related art, as disclosed in JP-A-1-169169, JP-A-1312266, JP-A-10-196759 and JP-A-11-63146, there is proposed an idea of combining the toroidal-type continuously variable transmission with a planetary gear mechanism. That is, in the low speed running operation of the vehicle, the drive power of an engine is transmitted only by the toroidal-type continuously variable transmission and, in the high speed running operation, the drive power is transmitted by the planetary gear mechanism, thereby reducing the torque that is applied to the toroidal-type, continuously variable transmission in the high speed running operation. To structure the toroidal-type continuously variable transmission in this manner can enhance the durability of the respective composing parts of the present toroidal-type continuously variable transmission.

Now, FIG. 14 shows a continuously variable transmission apparatus which is disclosed in the above cited JP-A-11-63146. This continuously variable transmission apparatus is composed of a combination of a toroidal-type continuously variable transmission 30 of a double cavity type and a planetary gear mechanism 31. And, in the low speed running operation of the vehicle, power is transmitted only by the toroidal-type continuously variable transmission 30 and, in the high speed running operation, the power is transmitted mainly by the planetary gear mechanism 31; and, a transmission ratio by the planetary gear mechanism 31 can be controlled by changing the transmission ratio of the toroidal-type continuously variable transmission 30.

For this purpose, the leading end portion (in FIG. 14, the right end portion) of an input shaft 11a, which penetrate through the central portion of the toroidal-type continuously variable transmission 30 and supports a pair of input side disks 2A, 2B on the two end portion thereof, is connected through a high speed clutch 35 to a transmission shaft 34 fixed to the central portion of a support plate 33 supporting a ring gear 32 which constitutes the planetary gear mechanism 31. By the way, of the pair of input side disks 2A, 2B, the input side disk 2B situated on the leading end side (in FIG. 14, on the right side) of the input shaft 11a, for example, similarly to the related-art structure shown in FIG. 13 which has been described above, is supported on the input shaft 11a in such a manner that it can be rotated synchronously with the input shaft 11a but can be substantially prevented against movement in the axial direction of the input shaft 11a. On the other hand, the input side disk 2A on the base end side (in FIG. 14, on the left side), for example, also similarly to the related-art structure shown in FIG. 13, is supported on the input shaft 11a in such a manner that it can be rotated synchronously with the input shaft 11a and can also be moved in the axial direction of the input shaft 11a. At any rate, the structure of the toroidal-type continuously variable transmission 30 is substantially similar to that of the related-art structure shown in FIG. 13 except for a pressing device 36 which will be described below.

Also, between the output side end portion (in FIG. 14, the right end portion) of a crankshaft 38 of an engine 37 serving as a drive source and the input side end portion (that is, the base end portion; in FIG. 14, the left end portion of the input shaft 11a, there are disposed a start clutch 39 and a pressing device 36 of an oil pressure type in series with each other in the power transmission direction. This pressing device 36 is capable of introducing a desired level of oil pressure which can generate a pressing force corresponding to the size of the power (torque) to be transmitted from the crankshaft 38 to the toroidal-type continuously variable transmission 30.

Also, an output shaft 40, which is used to take out power based on the rotation of the input shaft 11a, is disposed concentrically with the input shaft 11a. And, the planetary gear mechanism 31 is disposed on the periphery of this output shaft 40. A sun gear 41 constituting the planetary gear mechanism 31 is fixed to the input side end portion (in FIG. 14, the left end portion) of the output shaft 40. Therefore, the output shaft 40 is rotated according as the sun gear 41 is rotated. The ring gear 32 is supported on the periphery of the sun gear 41 in such a manner that it is concentric with the sun gear 41 and can be rotated. And, between the inner peripheral surface of the ring gear 32 and the outer peripheral surface of the sun gear 41, there are interposed a plurality of planetary gear sets 43, 43 each set consisting of a pair of planetary gears 42a, 42b. Each pair of planetary gears 42a, 42b are in meshing engagement with each other, the planetary gear 42a situated on the outside diameter side is in meshing engagement with the ring gear 32, and the planetary gear 42b on the inside diameter side is in meshing engagement with the sun gear 41. The thus structured planetary gear sets 43, 43 are respectively supported on one side surface (in FIG. 14, the left side surface) of a carrier 44 in such a manner that they can be rotated. Also, the carrier 44 is rotatably supported on the middle portion of the output shaft 40.

Also, the carrier 44 is connected to the pair of output side disks 4, 4, which constitute the toroidal-type continuously variable transmission 30, by a first power transmission mechanism 45 in such a manner that a rotational force can be transmitted between them. This first power transmission mechanism 45 comprises a transmission shaft 46 disposed in parallel to the input shaft 11a and output shaft 40, a sprocket 47a fixed to one end portion (in FIG. 14, the left end portion) of the transmission shaft 46, a sprocket 47b fixed to the output side disks 4, 4, a chain 48 interposed between the two sprockets 47a, 47b so as to extend between them, and first and second gears 49, 50 disposed such that they are respectively fixed to the other end (in FIG. 14, the right end) of the transmission shaft 46 and carrier 44 and also they are meshingly engaged with each other. Therefore, the carrier 4, 4, according to the rotational movements of the output side disks 4, 4, can be rotated in the opposite direction to these output side disks 4, 4 at the speed that corresponds to the number of teeth of the first and second gears 49, 50. By the way, this is based on the assumption that the pair of sprockets 47a, 47b are identical with each other in the number of teeth.

On the other hand, the input shaft 11a and ring gear 32 can be connected with each other in such a manner that the rotational force can be transmitted between them through the transmission shaft 34 disposed concentrically with the input shaft 11a. Between the transmission shaft 34 and input shaft 11a, there is interposed the high speed clutch 35 in series with these two shafts 34, 11a. Therefore, in the present structure, a second transmission shaft 53 is constituted by the transmission shaft 34. And, when the high speed clutch 35 is connected, the transmission shaft 34 can be rotated at the same speed and in the same direction as the input shaft 11a according as the input shaft 11a is rotated.

Also, the continuously variable transmission apparatus includes a clutch mechanism which constitutes mode switching means. This clutch mechanism comprises the above-mentioned high speed clutch 35, a low speed clutch 51 interposed between the outer peripheral edge portion of the carrier 44 and the axial-direction one end portion (in FIG. 14, the right end portion) of the ring gear 32, and a backing clutch 52 interposed between the ring gear 32 and a fixed part such as the housing (not shown) of the present continuously variable transmission apparatus. The clutches 35, 51 and 52 are structured in such a manner that, in case where any one of them is connected, the connection of the remaining two clutches is cut.

In the above structured continuously variable transmission apparatus, firstly, in the low speed running operation of a vehicle, the low speed clutch 51 is connected and, at the same time, the connection of the high speed clutch 35 and backing clutch 52 is cut. In this state, in case where the start clutch 39 is connected to thereby rotate the input shaft 11a, only the toroidal-type continuously variable transmission 30 transmits the power from the input shaft 11a to the output shaft 40. In the case of the low speed running operation, the transmission ratio between the two pairs of input side disks 2A, 2B and output side disks 4, 4 can be controlled similarly to the structure shown in FIG. 13 in which only the toroidal-type continuously variable transmission is used.

On the other hand, in the high speed running operation of a vehicle, the high speed clutch 35 is connected and, at the same time, the connection of the low speed clutch 51 and backing clutch 52 is cut. In this state, in case where the start clutch 39 is connected to thereby rotate the input shaft 11a, the power is transmitted from the input shaft 11a to the output shaft 40 by the transmission shaft 34 and planetary gear mechanism 31. That is, in case where the input shaft 11a is rotated in the above high speed running operation, the rotation of the input shaft 11a is transmitted to the ring gear 32 through the high speed clutch 35 and transmission shaft 34. And, the rotation of the ring gear 32 is transmitted to the sun gear 41 through the planetary gear sets 43, 43, thereby rotating the output shaft 40 to which the sun gear 41 is fixed. In this state, in case where the transmission ratio of the toroidal-type continuously variable transmission 30 is changed to thereby change the revolving speed (around the periphery of the sun gear 41) of the respective planetary gear sets 43, 43, the transmission ratio of the whole of the continuously variable transmission apparatus can be controlled.

That is, in the above-mentioned high speed running operation, the respective planetary gear sets 43, 43 are revolved around the periphery of the sun gear 41 in the same direction as the ring gear 32. And, the slower the revolving speed (around the periphery of the sun gear 41) of these planetary gear sets 43, 43 is, the faster the rotation speed of the output shaft 40 with the sun gear 41 fixed thereto is. For example, in case where the revolving speed (around the periphery of the sun gear 41) of these planetary gear sets 43, 43 is equal to the rotation speed of the ring gear 32 (both are angular speeds), the rotation speed of the ring gear 32 becomes equal to that of the output shaft 40. On the other hand, in case where the revolving speed (around the periphery of the sun gear 41) of these planetary gear sets 43, 43 is slower than the rotation speed of the ring gear 32, the rotation speed of the output shaft 40 becomes faster than that of the ring gear 32. Contrary to this, in case where the revolving speed (around the periphery of the sun gear 41) of the planetary gear sets 43, 43 is faster than the rotation speed of the ring gear 32, the rotation speed of the output shaft 40 becomes slower than that of the ring gear 32.

Therefore, in the high speed running operation, as the transmission ratio of the toroidal-type continuously variable transmission 30 is changed to the reducing side, the transmission ratio of the whole of the continuously variable transmission apparatus changes to the speed increasing side. In such high speed running operation state, to the toroidal-type continuously variable transmission 30, there is applied torque (assuming that torque applied in the low speed operation is positive torque, negative torque is applied) not from the input side disks 2A, 2B but from the output side disk 4. That is, in a state where the high speed clutch 35 is connected, torque transmitted from the engine 37 to the input shaft 11a is transmitted through the transmission shaft 34 to the ring gear 32 of the planetary gear mechanism 31. For this reason, there exists little torque which is transmitted from the input shaft 11a side to the respective input side disks 2A, 2B.

On the other hand, part of torque transmitted through the second power transmission device 53 to the ring gear 32 of the planetary gear mechanism 31 is transmitted from the planetary gear sets 43, 43 through the carrier 44 and first power transmission mechanism 45 to the respective output side disks 4, 4. In this manner, the torque to be applied to the toroidal-type continuously variable transmission 30 from the respective output side disks 4, 4 decreases as the transmission ratio of the toroidal-type continuously variable transmission 30 is changed to the reducing side so as to change the transmission ratio of the continuously variable transmission apparatus to the speed increasing side. As a result of this, in the high speed running operation, the torque to be input to the toroidal-type continuously variable transmission 30 can be reduced to thereby be able to enhance the durability of the composing parts of the toroidal-type continuously variable transmission 30.

Further, when rotating the output shaft 40 reversely so as to back the vehicle, the connection of the low speed and high speed clutches 51, 35 is cut and, at the same time, the backing clutch 52 is connected. Due to this, the ring gear 32 is fixed and the planetary gear sets 43, 43, while meshingly engaged with the ring gear 32 and sun gear 41, rotate around the periphery of the sun gear 41. And, the sun gear 41 and the output shaft 40, to which the sun gear 41 is fixed, are rotated in the opposite direction to the direction in the low speed running operation and high speed running operation.

By the way, the above-described continuously variable transmission apparatus is a transmission apparatus of a so called power split type which is arranged to reduce the torque that passes through the toroidal-type continuously variable transmission 30 in the high speed operation. In the case of the continuously variable transmission apparatus of this type, since the output shaft 40 cannot be stopped while the input shaft 11a remains rotating, there is necessary the start clutch 39. On the other hand, there is also disclosed in JP-A-11-63148 and British Patent Publication GB2 256 015 A, a continuously variable transmission apparatus of a so called geared neutral type structured such that, the specifications of the planetary gear mechanism and the combination of the planetary gear mechanism with the toroidal-type continuously variable transmission are modified, whereby the output shaft can be stopped while the input shaft remains rotating. In the case of the continuously variable transmission apparatus of a geared neutral type, when the output shaft is stopped or is rotated at a low speed, torque passing through the toroidal-type continuously variable transmission apparatus increases but, instead, the start clutch can be omitted.

Of the respective related-art transmission structures described above, the continuously variable transmission apparatus shown in FIG. 14 is advantageous in that transmission of torque is possible while securing durability. However, when taking it into consideration to transmit larger torque while securing sufficient durability, in the case of a simple combination of the related-art structures, there is a possibility that such combination is not be able to realize the above need sufficiently. That is, when taking it into consideration to realize a structure which is capable of transmission of larger torque using the structure shown in FIG. 14, there arises the need to transmit large power not only between the output portion of the start clutch 29 and input shaft 11a but also between the input shaft 11a and high speed clutch 35. However, in related art, there has not been known a practical structure which is capable of transmitting larger torque in these two parts. For example, in JP-A-11-303961, there is disclosed a structure in which the near-to-outer-surface-inside-diameter portion of the output side disk is concavely and convexly engaged with the end portion of a sleeve. However, since the diameter of the torque transmission part thereof is small, it is not always possible to transmit large torque.

SUMMARY OF THE INVENTION

The continuously variable transmission apparatus according to the present invention has been invented in the light of the above-mentioned problems.

In attaining the above object, according to a first aspect of the invention, there is provided a toroidal-type continuously variable transmission, comprising:

an input shaft;

an input side disk including an inner surface and rotatable integrally with the input shaft;

an output side disk including an inner surface, disposed concentrically with the input side disk, and ratable independently of the input shaft;

a plurality of trunnions interposed between the input side and output side disks and swingy about their respective pivot shafts placed at twisted positions with respect to center axes of the input side and output side disks;

a plurality of displacement shafts respectively projected out from inner surfaces of the their associated trunnions; and, a plurality of power rollers held by and between the inner surfaces of the input side and output side disks in such a manner that they can be rotatably supported on the their associated displacement shafts; and, a transmission member including a plurality of transmitting projection pieces on the base end portion thereof, wherein a plurality of projecting portions are provided on and projected from part of an outer peripheral surface of the input side disk, and the transmitting projection pieces of the transmission member are engaged with the projecting portions of the input side disk to thereby be able to transmit torque between the input side disk and the transmission member.

Further, according to a second aspect of the invention, in the toroidal-type continuously variable transmission according to the first aspect, the transmitting projection pieces are provided on a transmission flange disposed on the transmission member at regular intervals with respect to a circumferential direction of the transmission flange.

Moreover, according to a third aspect of the invention, in the toroidal-type continuously variable transmission according to the first aspect, the projecting portions of the input side disk are provided on and projected from a portion of the outer peripheral portion of the input side disk that is placed nearer to an outside diameter thereof than a central portion thereof.

According to a fourth aspect of the invention, there is provided a toroidal-type continuously variable transmission, comprising:

a first transmission shaft;

a second transmission shaft disposed concentrically with the first transmission shaft for transmitting torque between the first transmission shaft and itself;

an input side disk including an inner surface and rotatable integrally with the first transmission shaft;

an output side disk including an inner surface, disposed concentrically with the input side disk, and ratable independently of the first transmission shaft;

a plurality of trunnions interposed between the input side and output side disks and swingy about their respective pivot shafts placed at twisted positions with respect to center axes of the input side and output side disks;

a plurality of displacement shafts respectively projected out from inner surfaces of the their associated trunnions; and, a plurality of power rollers held by and between the inner surfaces of the input side and output side disks in such a manner that they can be rotatably supported on the their associated displacement shafts, wherein an outwardly-facing flange portion is disposed on an outer peripheral surface of an end portion of the first transmission shaft, a plurality of notches are formed in an outer peripheral edge portion of the flange portion, a plurality of driving projection portions are formed on an end portion of the second transmission shaft, and the notches of the first transmission shaft are respectively engaged with the driving projection pieces of the second transmission shaft to thereby be able to transmit torque between the first and second transmission shafts.

According to a fifth aspect of the invention, there is provided a continuously variable transmission apparatus, comprising:

an input shaft;

an output shaft for taking out power based on the rotation of the input shaft;

a toroidal-type continuously variable transmission;

a planetary gear mechanism;

a first power transmission mechanism for transmitting power input to the input shaft through the toroidal-type continuously variable transmission; and, a second power transmission mechanism for transmitting the power input to the input shaft not through the toroidal-type continuously variable transmission, the toroidal-type continuously variable transmission, comprising:

a pair of input side disks each including an inner surface, respectively supported on two end portions of the input shaft, and rotatable according as the input shaft is rotated;

a pair of output side disks each including an inner surface, and respectively disposed on a periphery of a middle portion of the input shaft in such a manner that they are concentric with the input side disks with their respective inner surfaces opposed to the inner surfaces of the input side disks, the output side disks being rotatable independently of and synchronously with the input side disks;

a plurality of trunnions interposed between the input side and output side disks and swingy about their respective pivot shafts placed at twisted positions with respect to center axes of the input side and output side disks;

a plurality of displacement shafts respectively projected out from inner surfaces of the their associated trunnions;

a plurality of power rollers held by and between the inner surfaces of the input side and output side disks in such a manner that they can be rotatably supported on the their associated displacement shafts, and;

a pressing device disposed on a periphery of the input shaft in parallel to the input shaft with respect to a power transmission direction for applying a force, with which the input side and output side disks hold the power rollers based on oil pressure, in correspondence to a size of power to be transmitted between the input side and output side disks, the planetary gear mechanism comprising:

a sun gear;

a ring gear disposed on a periphery of the sun gear;

a planetary gear rotatably interposed between the sun gear and the ring gear and meshingly engageable with the sun gear and the ring gear; and, a carrier for supporting the planetary gear, wherein the second power transmission mechanism includes a transmission shaft, the transmission shaft includes a plurality of transmitting projection pieces extending outwardly in a diameter direction thereof from an end portion thereof, a plurality of projecting portions are provided on part of an outer peripheral surfaces of the input side disks, power to be transmitted through the first power transmission mechanism and power transmitted through the second power transmission mechanism can be transmitted to two of the sun gear, the ring gear and the carrier, the output shaft is connected to the remaining one of the sun gear, the ring gear and the carrier, and the transmitting projection pieces of the transmission shaft are engaged with the projecting portions of the input side disks to thereby be able to transmit a rotational force from the input side disks to the transmission shaft.

According to a sixth aspect of the invention, the continuously variable transmission apparatus according to the fifth aspect of the invention, further comprising:

a drive shaft disposed concentrically with the input shaft and having a plurality of driving projection portions in an end portion thereof, wherein an outwardly-facing flange portion is disposed on an outer peripheral surface of an end portion of the input shaft, a plurality of notches are in an outer peripheral edge portion of the flange portion, and the driving projection portions of the drive shaft are respectively engaged with the notches of the input shaft, whereby allowing the drive shaft to drive and rotate the input shaft.

According to a seventh aspect of the invention, the continuously variable transmission apparatus according to the fifth aspect of the invention, further comprising:

a mode switching mechanism for switching a mode of transmitting power input into the input shaft to the planetary gear mechanism through the first and second power-transmission mechanisms;

wherein the node switching mechanism is capable of switching the following three modes over to one another: that is, a first mode of transmitting the power only using the first power transmission mechanism; a second mode of transmitting the power using both of the first and second power transmission mechanisms; and, a third mode of not only transmitting the power only using the first power transmission mechanism but also reversing a rotation direction of the output shaft with respect to the first and second modes.

The basic operations of the above structured toroidal-type continuously variable transmission and continuously variable transmission apparatus according to the invention, which are executed when power is transmitted between the input side and output side disks or between the input and output shafts and a transmission ratio is changed between the input side and output side disks or between the input and output shafts, are similar to those of the related-art toroidal-type continuously variable transmission and continuously variable transmission apparatus shown in FIGS. 8 to 14 which have been previously described herein.

Especially, in the case of the toroidal-type continuously variable transmission and continuously variable transmission apparatus according to the invention, due to engagement between the plurality of projecting portions formed in the near-to-outside-diameter half section of the outer surface of the disk and the leading end portions of the transmitting projection pieces formed on the transmission member for transmitting the torque, or due to engagement between the plurality of notches formed in the outer peripheral edge portion of the flange portion formed in the rotary shaft or input shaft and the leading end portions of the driving projection portions, great torque transmission can be realized properly in the respective power transmission parts.

BRIEF DESCRIPTION OF THE DRAWINGS

FIG. 1 is a section view of the main portions of an embodiment according to the invention;

DETAILED DESCRIPTION OF THE INVENTION

Figure 1:
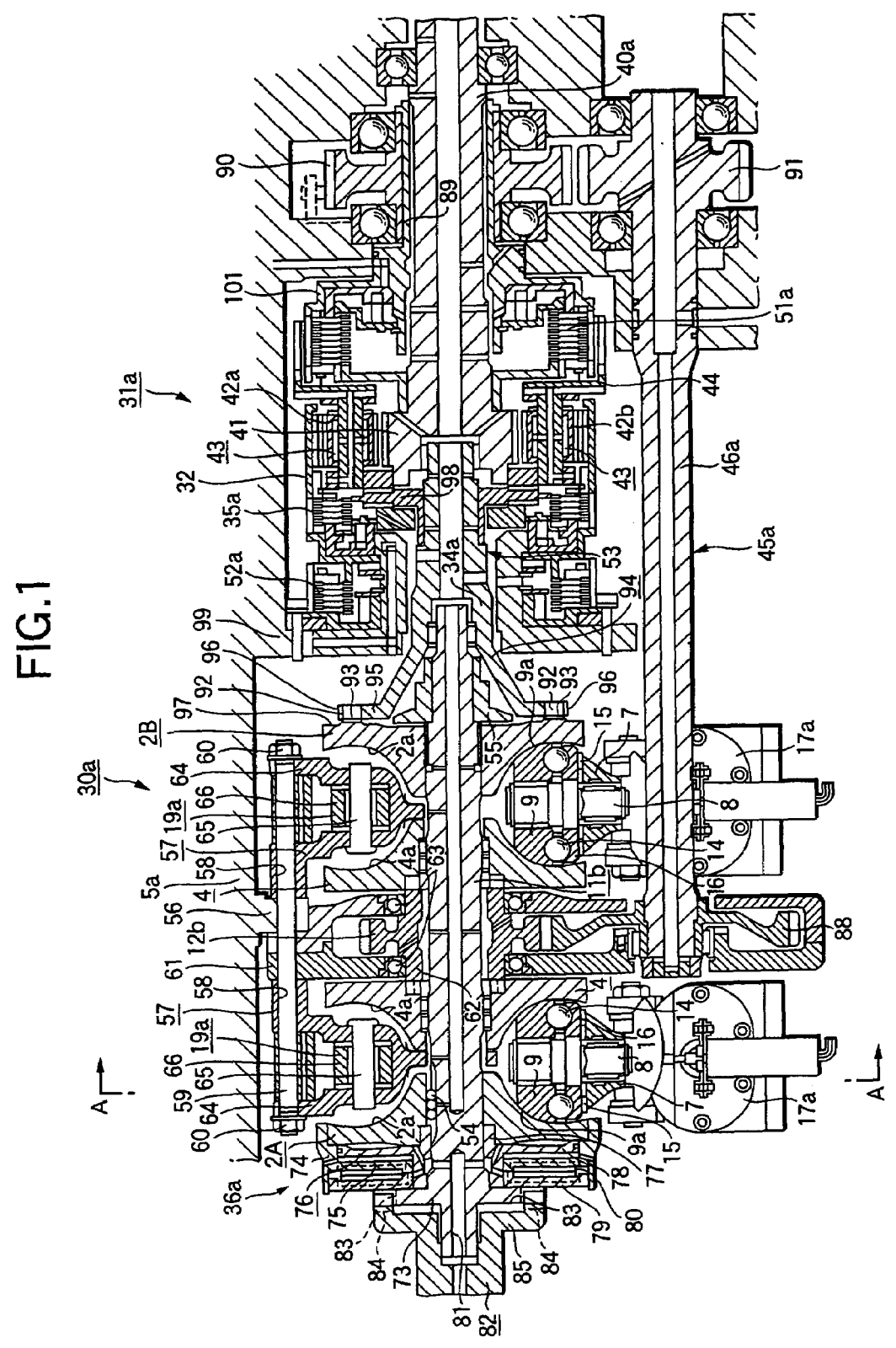
Figure 2:
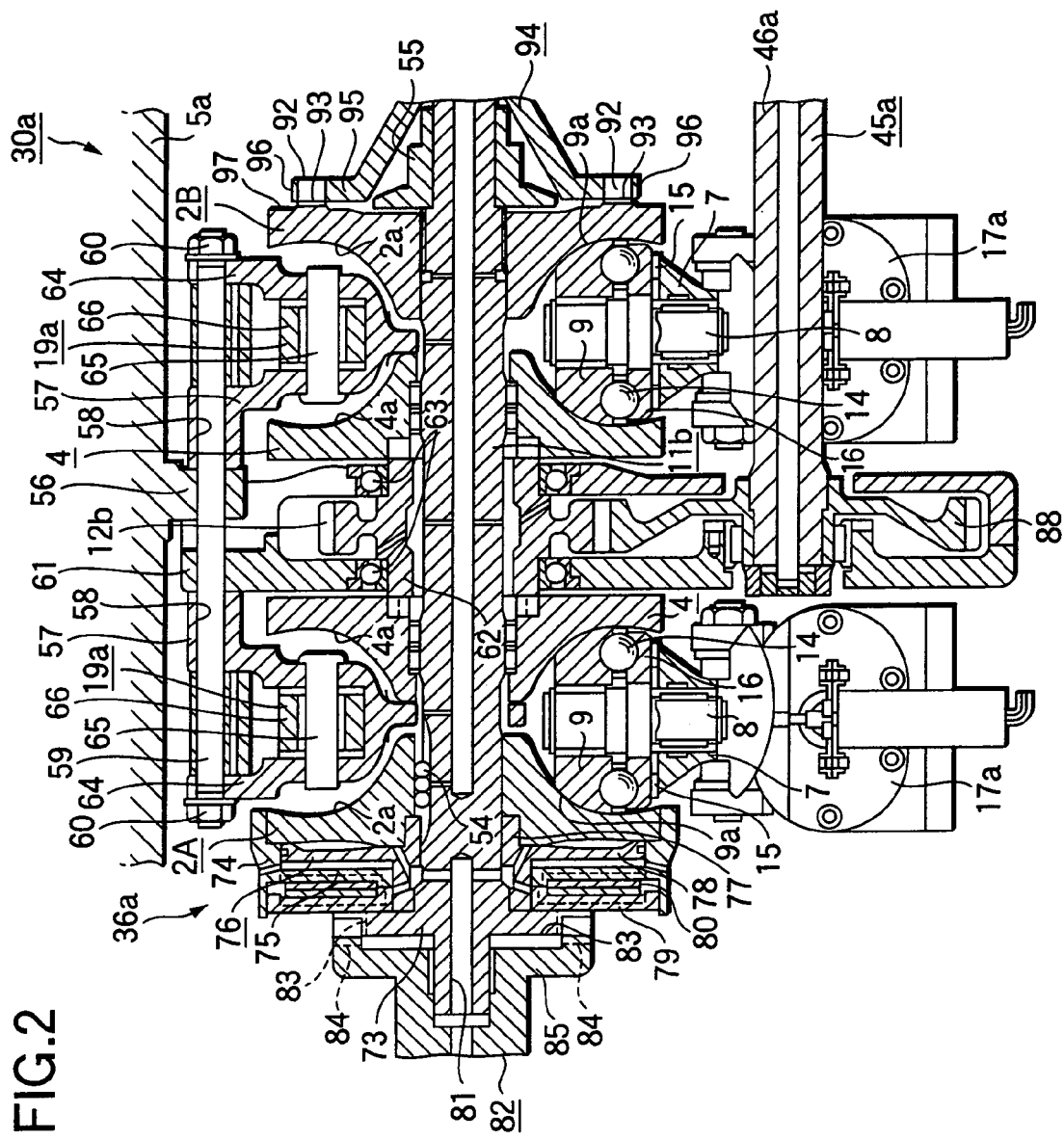
FIG. 2 is an enlarged view of a left half section shown in FIG. 1.

Now, FIGS. 1 to 7 show an embodiment of a mode for carrying out the invention. By the way, in the illustrated embodiment, there is shown a continuously variable transmission apparatus structured by combining together a toroidal-type continuously variable transmission 30a and a planetary gear mechanism 31a. The present continuously variable transmission apparatus comprises an input shaft 11b, an output shaft 40a, the above-mentioned toroidal-type continuously variable transmission 30a, the above-mentioned planetary gear mechanism 31a, a first power transmission mechanism 45a, and a second power transmission mechanism 52. Of these parts, the input shaft 11b is connected to a drive source such as an engine 37 (see FIG. 14) and thus the input shaft 11b can be driven or rotated by this drive source. Also, the output shaft 40a is used to take out power generated based on the rotation of the input shaft 11b and is also connected to a wheel drive shaft (not shown) through a differential gear (not shown).

Figure 13:
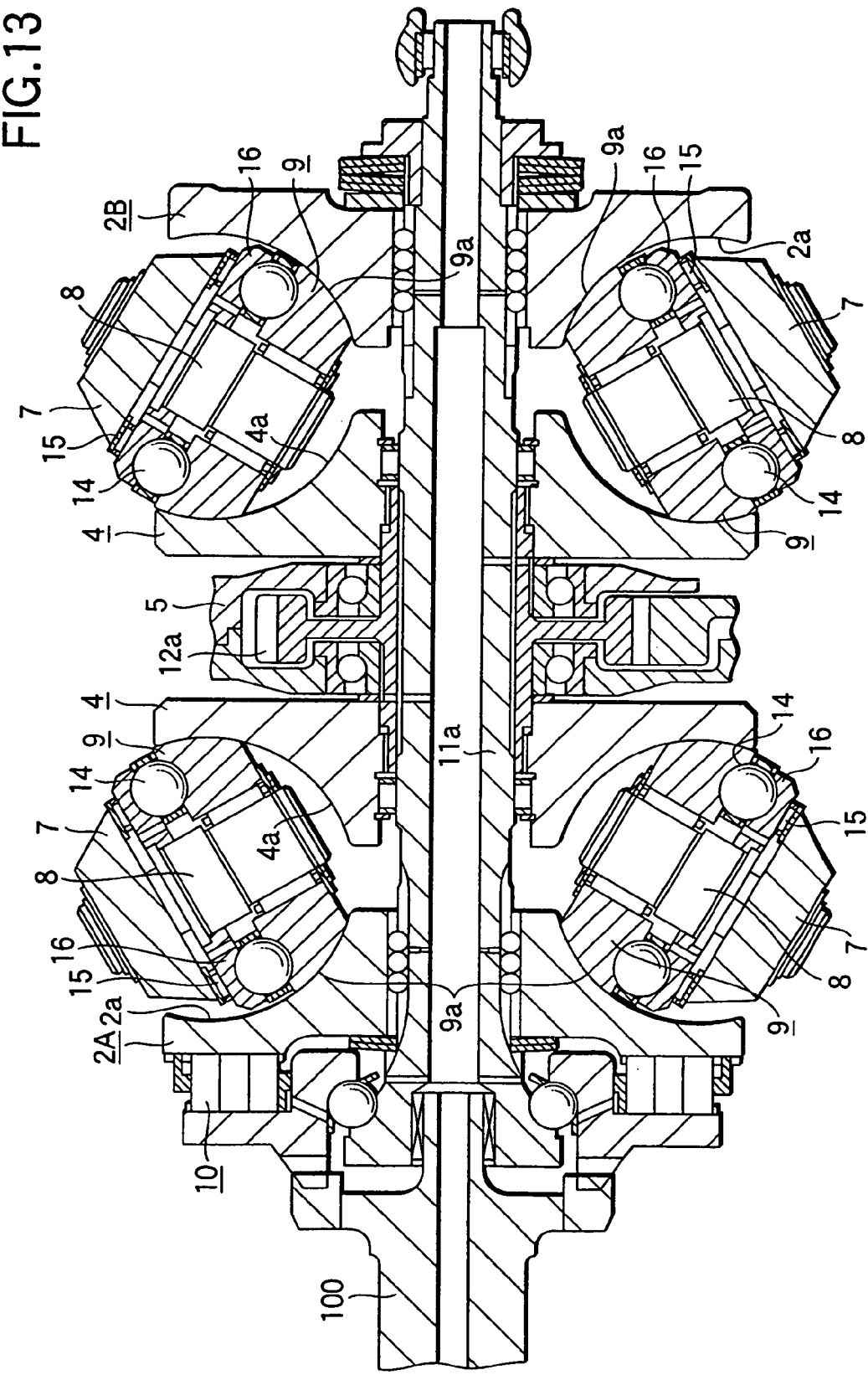
FIG. 13 is a-partially cut front view of the main portions of a second example of a related-art structure for increasing the power that can be transmitted.
Figure 14:
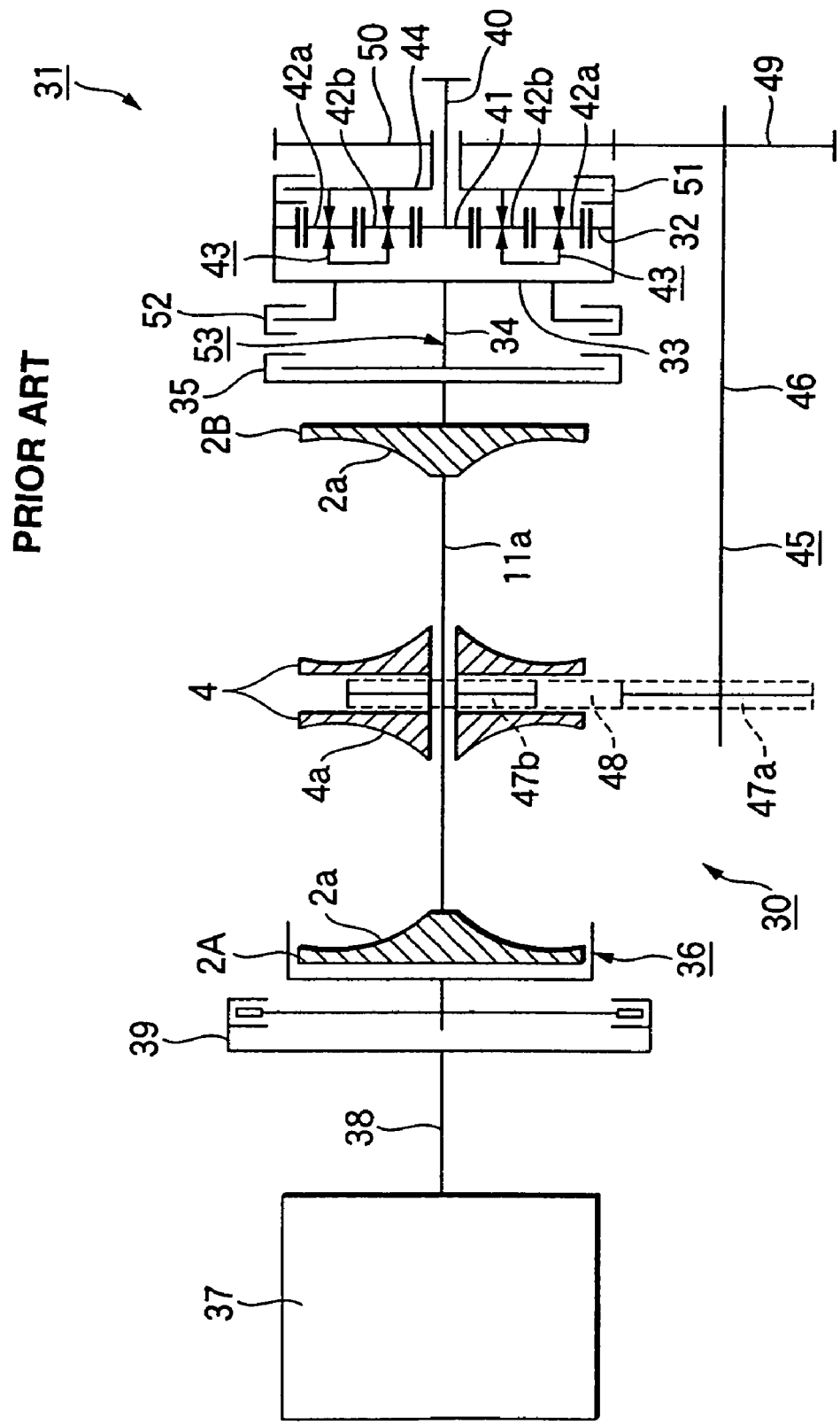
FIG. 14 is a schematic section view of an example of a continuously variable transmission apparatus consisting of a combination of a toroidal-type continuously variable transmission and a planetary gear mechanism.

Also, the present toroidal-type continuously variable transmission 30a is such a transmission of a double cavity type as shown in FIGS. 13 and 14; and, in each of the double cavities thereof, there are disposed three trunnions 7, 7 and three power rollers 9, 9, that is, a total of six trunnions and a total of six power rollers in the double cavities of the toroidal-type continuously variable transmission 30a. In order to construct such toroidal-type continuously variable transmission 30a, a pair of input side disks 2A, 2B are supported on the two end portions of the input shaft 11b in such a manner that their respective inner surfaces 2a, 2a are opposed to each other and they can be rotated synchronously with the input shaft 11b. Of the two input side disks, the input side disk 2A situated on the base end side (that is, the drive source side; in FIGS. 1 and 2, the left side) of the input shaft 11b is supported through a ball spline 54 on the input shaft 11b in such a manner that it can be displaced in the axial direction of the input shaft 11b. On the other hand, the input side disk 2B on the leading end side (that is, the side distant from the drive source; in FIGS. 1 and 2, the right side) of the input shaft 11b is fixed to the input shaft 11b in such a manner that the back surface of the input side disk 2B is held by a loading nut 55 while the input side disk 2B is spline engaged with the leading end portion of the input shaft 11b.

And, on the periphery of the middle portion of the input shaft 11b that intervenes between the pair of input side disks 2A, 2B, there are disposed a pair of output side disks 4, 4 in such a manner that their respective inner surfaces 4a, 4a are opposed to the inner surfaces 2a, 2a of the input side disks 2A, 2B and they can be rotated synchronously with each other. Also, between the inner surfaces 2a, 4a of the input side disks 2A, 2B and output side disks 4, 4, there are interposed power rollers 9, 9 which are respectively rotatably supported on the inner surfaces of their associated trunnions 7, 7.

In order to support the respective trunnions 7, 7, a frame 57 is connected to and fixed to a mounting portion 56 formed in the inner surface of a casing 5a by three studs 59, 59 respectively inserted through their associated three mounting holes 58, 58 formed at three positions in the outside-diameter-side end portion of the frame 57 and three nuts 60, 60 respectively threadedly engaged with their associated studs 59, 59. In the illustrated embodiment, a gear housing 61 is fixed between the mounting portion 56 and frame 57 by these studs 59, 59 and nuts 60, 60. On the inside diameter side of the gear housing 61, there is rotatably supported a sleeve 62 by a pair of rolling bearings 63, 63, while the pair of output side disks 4, 4 are concavely and convexly engaged with the two end portions of the sleeve 62; and, an output gear 12b disposed on the outer peripheral surface of the middle portion of the output sleeve 62 is stored in the interior of the gear housing 61.

Also, the frame 57 is formed in a star shape as a whole, and the diameter-direction middle portion of the frame 57 or the outside-diameter portion thereof is forked to thereby provide three hold portions 64, 64 at regular intervals in the circumferential direction of the frame 57. And, the middle portions of support pieces 19a, 19a are pivotally supported on the diameter-direction middle portions of these hold portions 64, 64 by second pivot shafts 65, 65, respectively. Each of the support pieces 19a, 19a includes a cylindrical-shaped mounting portion 66 situated on the periphery of its associated one of the second pivot shafts 65, 65 and a pair of support plate portions 67, 67 projecting outwardly in the diameter direction of its associated support piece 19a from the outer peripheral surface of the mounting portion 66. The pair of support plate portions 67, 67 intersect each other at an angle of 120°. Therefore, the support plate portions 67, 67 of the support pieces 19a, 19a which adjoin each other in the circumferential direction of the frame 57 are parallel to each other.

In the support plate portions 67, 67, there are formed circular holes 68, 68, respectively. When the support pieces 19a, 19a are held in their neutral states, the circular holes 68, 68 formed in the support plate portions 67, 67 of the support pieces 19a, 19a adjoining each other in the circumferential direction of the frame 57 are concentric with each other. And, pivot shafts 6, 6 disposed on each of the two end portions of the trunnions 7, 7 are respectively supported in their associated circular holes 68, 68 by their associated radial needle roller bearings 69, 69. The radial needle roller bearings 69, 69 respectively include outer races 70, 70, while each of the outer races 70, 70 has an outer peripheral surface which is formed in a spherically convex surface. These outer races 70, 70 are respectively fitted into their associated circular holes 68, 68 in such a manner that they have no play between them and can be swingingly displaced. Also, in part of the respective support plate portions 67, 67, there are formed arc-shaped elongated holes 71, 71 which are respectively concentric with their associated circular holes 68, 68; and, studs 72, 72 projectingly provided on the end faces (shoulder portions) of the respective trunnions 7, 7 are loosely engaged into their associated elongated holes 71, 71, thereby constituting a stopper mechanism for limiting the inclination angles of the trunnions 7, 7 with their respective pivot shafts 6, 6 as the centers thereof.

On the inner surfaces of the trunnions 7, 7 supported in the interior of the casing 5a in this manner, similarly to the previously described related-art structure, there are supported the power rollers 9, 9 through the displacement shafts 8. And, the peripheral surfaces 9a, 9a of the power rollers 9, 9 are contacted with the inner surfaces 2a, 4a of the disks 2A, 2B, 4. Also, between the input side disk 2A on the base end side and input shaft 11b, there is assembled a pressing device 36a of an oil pressure type to thereby secure surface pressures in the contact portions between the respective surfaces 9a, 2a, 4a, whereby the power transmission by the toroidal-type continuously variable transmission 30a can be executed with good efficiency.

In order to construct the pressing device 36a, an outwardly facing flange portion 73 is fixedly secured to the near-to-base-end portion of the outer peripheral surface of, the input shaft 11b and, at the same time, a cylinder tube 74 is oil-tight fitted with and supported on the outer surface of the input side disk 2A on the base end side of the input shaft 11b in such a manner that it projects in the axial direction of the input shaft 11b from the outer surface (in FIGS. 1 and 2, the left surface) of the input side disk 2A. The inside diameter of the cylinder tube 74 is set small in the axial-direction middle portion thereof and large in the two end portions thereof; and, the input side disk 2A is oil-tight fitted with the inner surface of the large-diameter portion of the cylinder tube 74 on the leading end side thereof in such a manner that it can be displaced in the axial direction thereof. Also, on the inner peripheral surface of the middle portion of the cylinder tube 74, there is disposed an inwardly-facing-flange-shaped partition plate portion 75. Further, between the inner peripheral surface of the cylinder tube 74 and the outer peripheral surface of the input shaft 11b, there is interposed a first piston member 76.

The first piston member 76 includes an outwardly-facing-flange-shaped partition wall plate 78 formed in the outer peripheral surface of the middle portion of a support tube portion 77 fittable with the outer surface, of the input shaft 11b, while the outer peripheral edge of the partition wall plate 78 is slidingly contacted oil-tight with the small-diameter portion of the middle portion of the inner peripheral surface of the cylinder tube 74 in such a manner that it can be displaced in the axial direction thereof. Also, in this state, the inner peripheral edge of the partition plate portion 75 is slidingly contacted oil-tight with the outer peripheral surface of the support tube portion 77 in such a manner that it can be displaced in the axial direction thereof. Further, between the outer peripheral surface of the base end portion of the support tube portion 77 and inner peripheral surface of the base end portion of the cylinder tube 74, there is interposed a second circular-ring-shaped piston member 79. The second piston member 79 is structured such that the side surface thereof on the base end side thereof is contacted with the flange portion 73 to thereby not only prevent the second piston member 79 from displacing in the axial direction thereof but also keep the inner and outer peripheral edges thereof oil-tight with respect to the outer peripheral surface of the base end portion of the support tube portion 77 and the inner peripheral surface of the base end portion of the cylinder tube 74.

Also, the cylinder tube 74 including the partition plate portion 75 is pressed against the input side disk 2A by a pre-load spring such as a countersunk spring 80 which is interposed between the partition plate portion 75 and second piston member 79. Therefore, (even in a state in which pressure oil is not introduced into the pressing device 36a) the input side disk 2A is pressed at least by a pressing force which corresponds to the elasticity of the countersunk spring 80, so that it applies a surface pressure, which corresponds to the elasticity of the counter sunk 80, to the contact portions between the respective surfaces 9a, 2a, 4a. Thus, when very small power is transmitted by the toroidal-type continuously variable transmission 30a, the elasticity of the countersunk spring 80 can restrict the respective surfaces 9a, 2a, 4a in such a manner that they are prevented against slippage (except for unavoidable spin) in their mutual contact portions.

Also, into oil pressure chambers which respectively intervene not only between the second piston member 79 and partition plate portion 75 but also between the-partition wall plate 78 and input side disk 2A, there can be introduced oil pressure through a center hole 81 formed in the input shaft 11b. This central hole 81 communicates through an oil pressure control valve (not shown) with an oil pressure source (not shown) such as a pressurizing pump. When the continuously variable transmission apparatus including the toroidal-type-continuously variable transmission 30 is in operation, the oil pressure, which has been controlled by the oil pressure control valve according to the size of the power to be transmitted, is introduced into the respective oil pressure chambers to press against the input side disk 2A, thereby applying the surface pressure, which corresponds to the size of the power, to the respective contact portions between the surfaces 9a, 2a, 4a.

In this case, the surface pressure to be applied to the respective contact portions provides a total of the surface pressure based on the oil pressure and the surface pressure based on the countersunk spring 80. Therefore, the oil pressure necessary to prevent slippage in the respective contact portions in the power transmission can be reduced by an amount corresponding to the elasticity of the countersunk spring 80; that is, a loss (pump loss) based on the driving of the oil pressure source can be reduced by an amount equivalent to provision of the countersunk spring 80. Also, in the illustrated embodiment, the pressing device 36a is composed of a pressing device of a double piston type which not only can secure a pressure receiving area without increasing the diameter thereof but also can reduce the oil pressure for securing the required pressing force. That is, the pump loss can be reduced in this respect as well. By the way, as the elements that must be taken into account when controlling the oil pressure, there can be selected not only the size of the power to be transmitted but also various elements which have influences on the operation of the toroidal-type continuously variable transmission 30, such as the transmission ratio and the temperature of traction oil.

Figure 6:
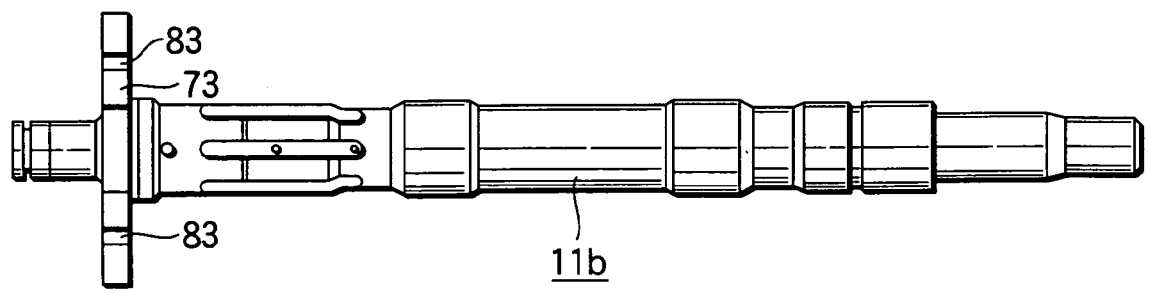
FIG. 6 is a side view of an input shaft, showing a state thereof in which it is viewed from the same direction of FIG. 1.
Figure 7:
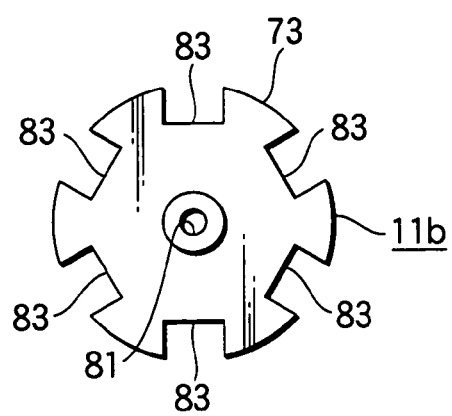
FIG. 7 is a view of the input shaft, showing a state thereof in which it is viewed from the left side of FIG. 6.

Also, the transmission of a rotational force from a drive shaft 82 serving as a second rotary shaft to the input shaft 11b serving as a first rotary shaft is executed through the flange portion 73. For this purpose, at a plurality of positions in the outer peripheral edge portion of the flange portion 73, there are formed such notches 83, 83 as shown in FIGS. 6 and 7 and, at the same time, these notches 83, 83 are respectively engaged with driving projections 84, 84 disposed on the end portion of the drive shaft 82. In the present embodiment, an outwardly-facing-flange-shaped connecting portion 85 is formed in the end portion of the drive shaft 82, and the driving projections 84, 84 are projectingly provided on the near-to-outside-diameter end portion of one surface of the connecting portion 85.

Further, on the trunnions 7, 7, there are respectively disposed actuators 17a, 17b each of an oil pressure type, so that these trunnions 7, 7 can be driven and displaced in the axial direction of the pivot shafts 6, 6 disposed on the two end portions thereof. Of these trunnions 7, 7, the trunnion 7 situated in the lower central portion of FIG. 3 can be driven and displaced in the axial direction of the pivot shafts 6, 6 disposed on the two end portions thereof through lever arms 86, 86 by a pair of actuators 17a, 17a which are respectively single acting actuators (which are capable of obtaining only the force in the push-out direction) with the pushing directions of which are mutually opposite. When displacing this trunnion 7; pressure-oil is supplied into only the oil pressure chamber of one actuator 17a, whereas the oil pressure chamber of the other actuator 17a is set free. On the other hand, the trunnions 7, 7 situated on the two upper sides in FIG. 3 can be driven and displaced in the axial direction of their respective pivot shafts 6, 6 disposed on the two end portions thereof by double acting actuators 17b, 17b (which can respectively obtain the push-out-direction force or pull-in-direction force in accordance with switching of the supply and discharge directions of the pressure oil).

Figure 12:
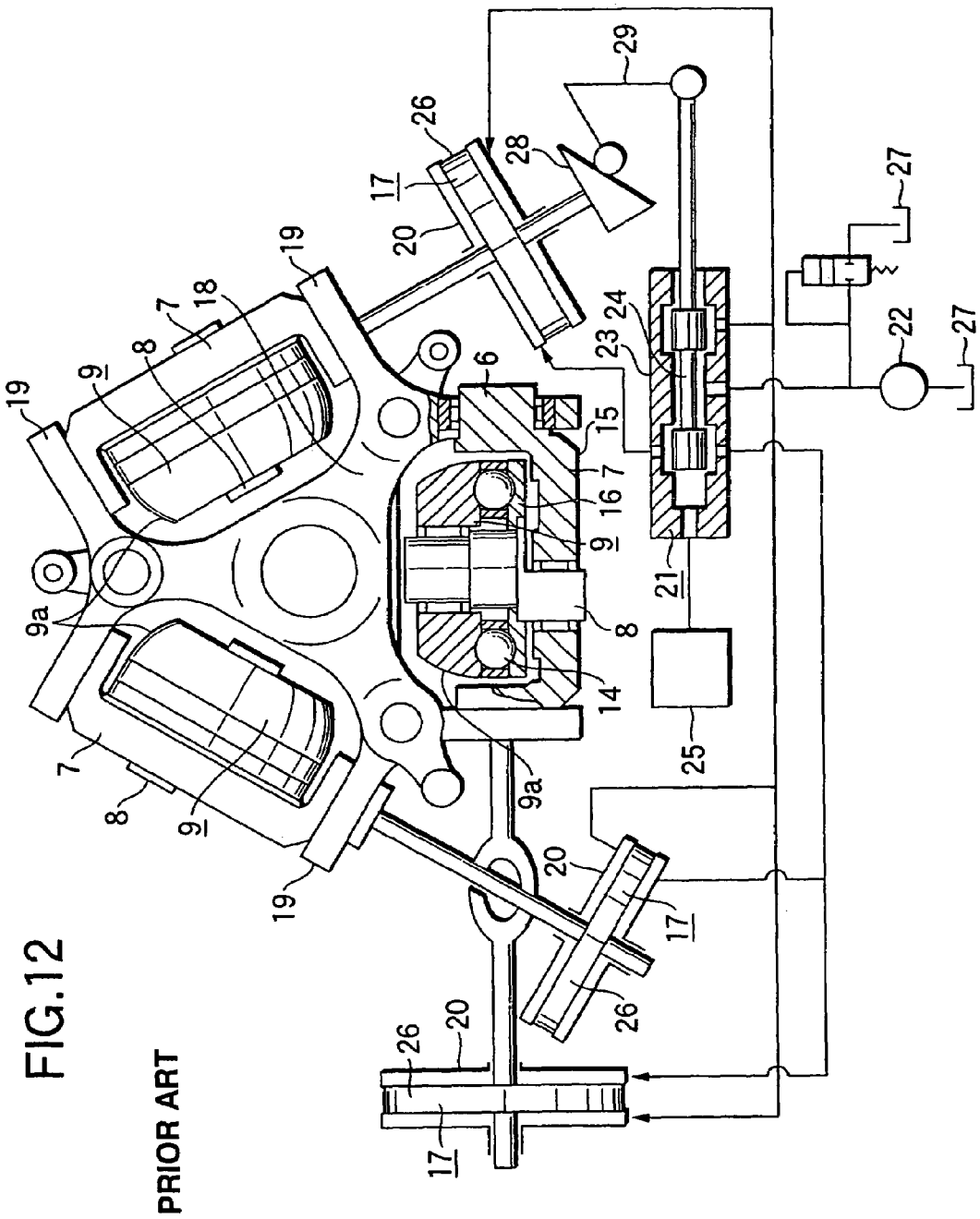
FIG. 12 is a partially cut front view of the main portions of a first example of a related-art structure for increasing the power that can be transmitted.

The displacement operations of a total of six trunnions 7, 7 disposed in the toroidal-type continuously variable transmission 30a are executed by the same length synchronously with one another by supplying and discharging an equal amount of pressure oil to the respective actuators 17a, 17b through the control valve 21 (see FIG. 12). To attain this purpose, a precess cam 28 is fixed to the end portion of a rod 87 which displaces together with any one trunnion 7 (in the illustrated embodiment, a trunnion 7 situated on the upper left side in FIG. 3), so that the attitude of the present trunnion 7 can be transmitted to the spool 24 of the control valve 21 through a link 29;

The independent action of the above structured toroidal-type continuously variable transmission 30a is as follows. When it is in operation, while the input side disk 2A on the base end side is being pressed by the pressing device 36a, the input shaft 11b is rotated. As a result of this, the pair of input side disks 2A, 2B respectively disposed on the two end portions of the input shaft 11b are rotated while they are pressed toward the output side disks 4, 4. The rotational movements of the input side disks 2A, 2B are transmitted through the power rollers 9, 9 to the output side disks 4, 4, and the rotational movements of the output side disks 4, 4 are taken out through the output sleeve 62 and output gear 12b.

Figure 8:
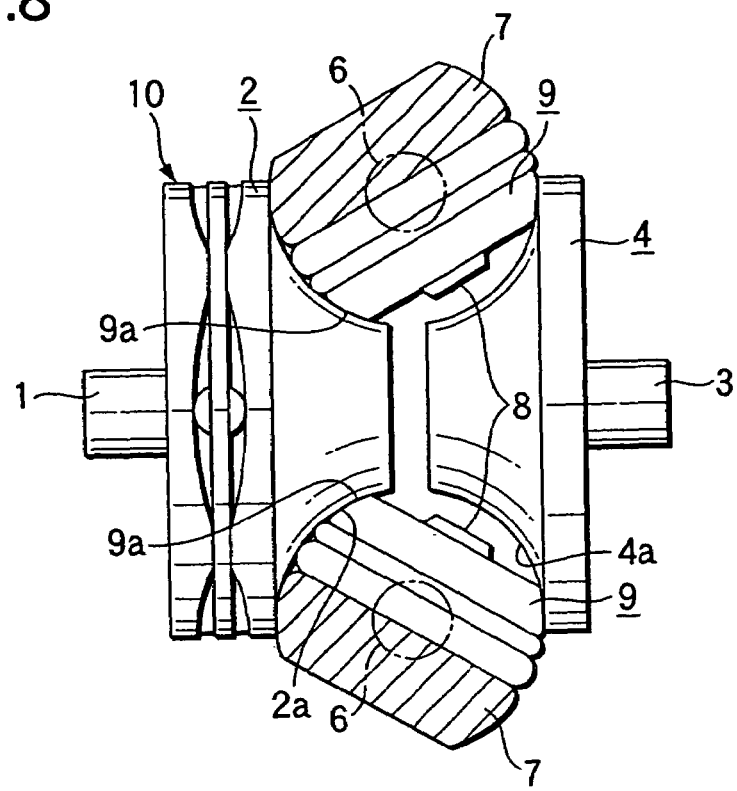
FIG. 8 is a side view of the basic structure of a related-art toroidal-type continuously variable transmission, showing the maximum speed reducing state thereof.
Figure 9:
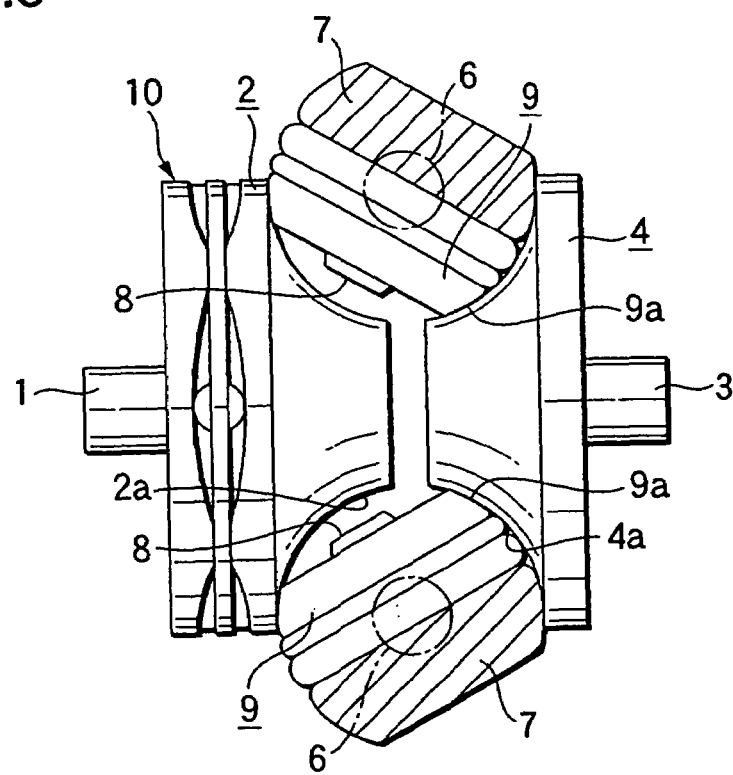
FIG. 9 is a side view of the basic structure of the related-art toroidal-type continuously variable transmission, showing the maximum speed increasing state thereof.
Figure 10:
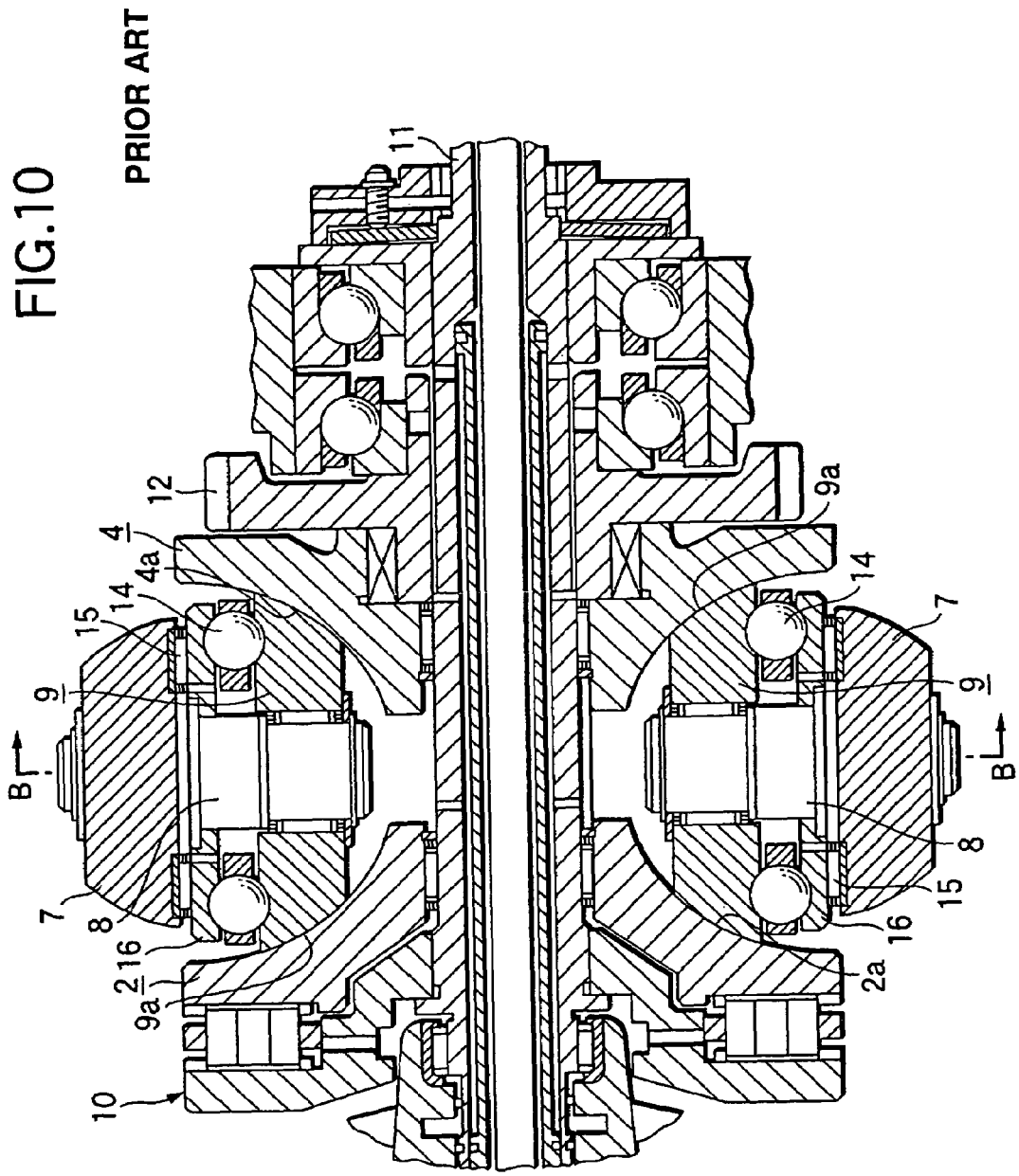
FIG. 10 is a section view of an embodiment of a related-art concrete structure.
Figure 11:
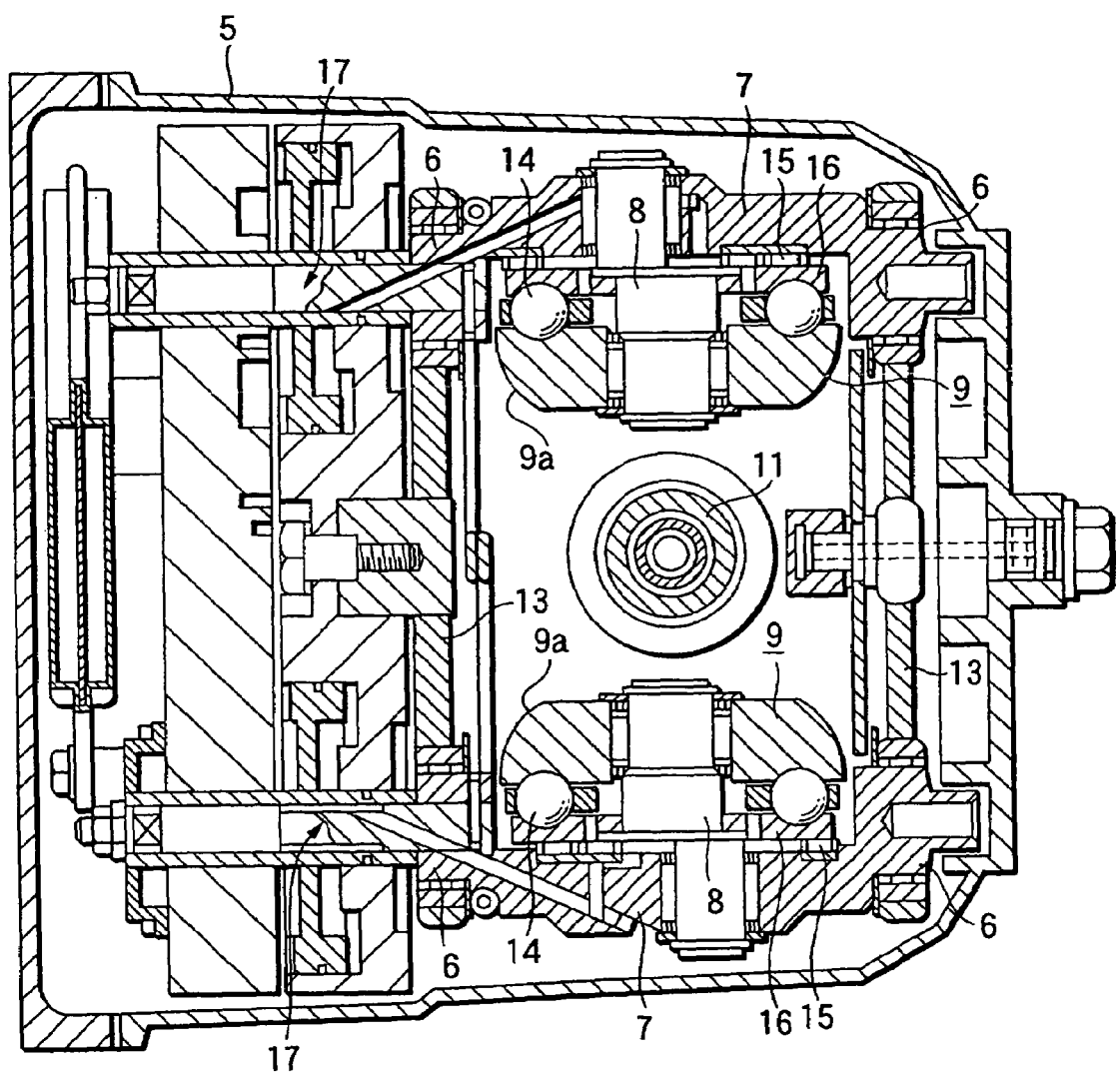
FIG. 11 is a section view taken along the line B—B shown in FIG. 10.

When swinging and displacing the trunnions 7, 7 supporting the power rollers 9, 9 thereon in order to change the transmission ratio between the input side disks 2A, 2B and output side disks 4, 4, the trunnions 7, 7 are respectively displaced by their associated actuators 17a, 17b in the axial directions of their associated pivot shafts 6, 6 disposed on each of the two end portions of the trunnions 7, 7 and by the same stroke with respect to the circumferential directions of the input side disks 2A, 2B and output side disks 4, 4. In case where the trunnions 7, 7 are displaced in this manner, similarly to the previously described related-art structure, the directions of the tangential-direction forces acting on the contact portions between the peripheral surfaces 9a, 9a of the power rollers 9, 9 supported by these trunnions 7, 7 and the inner surfaces 2a, 4a of the input side and output side disks. 2A, 2B, 4 are changed and thus, as shown in FIGS. 8 and 9 which have been previously described, the contact positions between the peripheral surfaces 9a, 9a of the power rollers 9, 9 and the inner surfaces 2a, 4a of the input side and output side disks 2A, 2B, 4 are changed, thereby changing the transmission ratio between the input side disks 2A, 2B and output side disks 4, 4.

Figure 3:
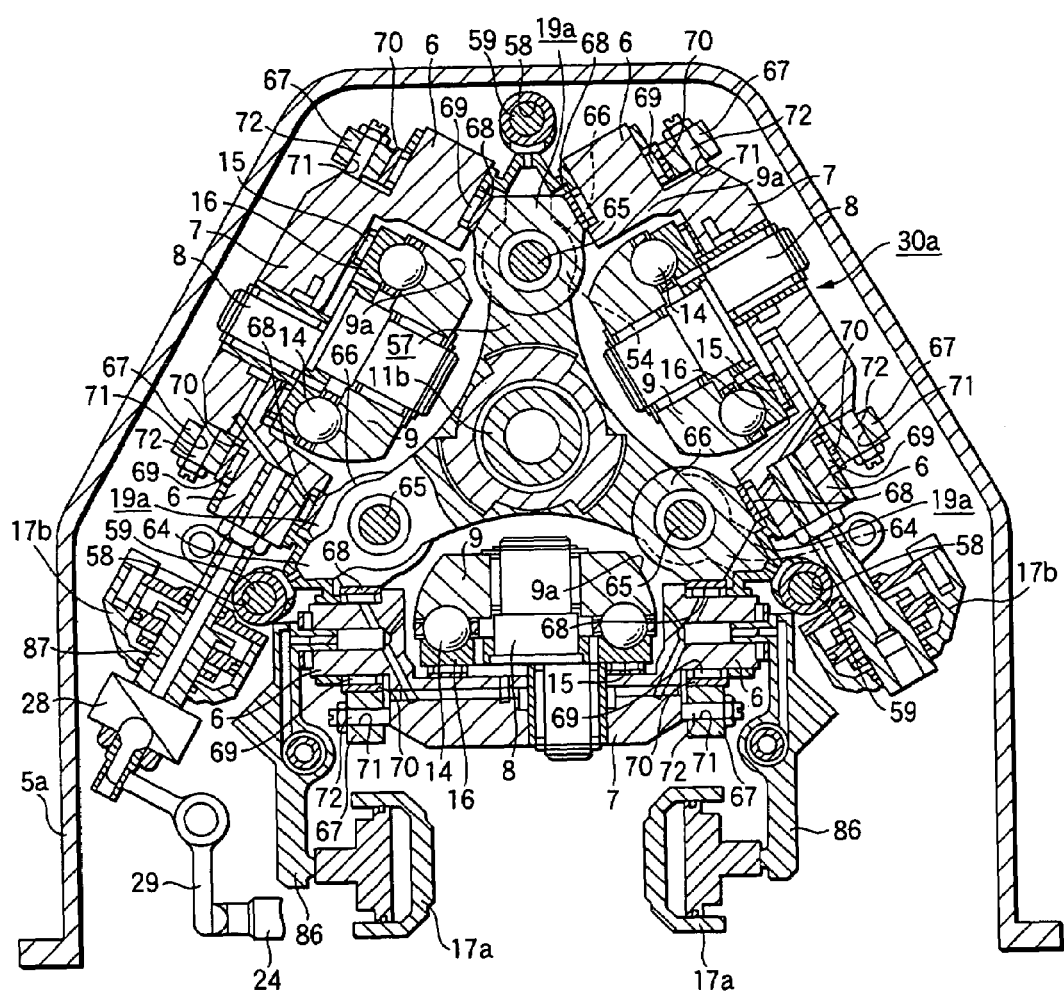
FIG. 3 is a section view taken along the line A—A shown in FIG. 1.

On the other hand, the displacement motion of the trunnion 7 on the upper left side in FIG. 3 involved with the supply and discharge of pressure oil into the actuators 17a, 17b is transmitted to the spool 24 through the precess cam 28 and link 29, thereby displacing the spool 24 in the axial direction thereof. As a result of this, in a state where the actuators 17a, 17b have displaced the trunnions 7, 7 by a given stroke, the flow passage of the control valve 21 is closed to thereby stop the supply and discharge of the pressure oil to the actuators 17a, 17b. The displacement amounts of the trunnions 7, 7 in the axial directions of their associated pivot shafts 6, 6 can be made to correspond to the displacement amount of the sleeve 23 (see FIG. 12) by the control motor 25.

While the structure and operation of the toroidal-type continuously variable transmission 30a are as described above, the planetary gear mechanism 31a to be combined with the toroidal-type continuously variable transmission 30a comprises a sun gear 41, a ring gear 32, and planetary gear sets 43, 43. The sun gear 41, is fixed to the input side end portion (in FIG. 1, the left end portion) of the output shaft 40a. Therefore, the output shaft 40a can be rotated according as the sun gear 41 is rotated. The ring gear 32 is supported on the periphery of the sun gear 41 in such a manner that it is concentric with the sun gear 41 and can be rotated. And, between the inner peripheral surface of the ring gear 32 and the outer peripheral surface of the sun gear 41, they are interposed a plurality of planetary gear sets 43, 43 each set composed of a pair of planetary gears 42a, 42b. And, each pair of planetary gear 42a, 42b are meshingly engaged with each other, while the planetary gear 42a situated on the outside diameter side is meshingly engaged with the ring gear 32 and the planetary gear 42b situated on the inside diameter side is meshingly engage with the sun gear 41. The thus structured planetary gear sets 43, 43 are rotatably supported on one side surface (in FIG. 1, the left side surface) of a carrier 44. Also, the carrier 44 is rotatably supported on the periphery of the middle portion of the output shaft 40a.

Also, the carrier 44 is connected to the pair of output side disks 4, 4 constituting the toroidal-type continuously variable transmission 30a by the first power transmission mechanism 45a in such a manner that the rotation power can be transmitted between them. In order to structure the first power transmission mechanism 45a, there is disposed a transmission shaft 46a which is parallel to the input shaft 11b and output shaft 40a, while a gear 88 fixed to one end portion (in FIG. 1, the left end portion) of the transmission shaft 46a is meshingly engaged with the output gear 12b. Also, on the periphery of the middle portion of the output shaft 40a, there is rotatably disposed a sleeve 89; and, a gear 90 supported on the outer peripheral surface of the sleeve 89 is meshingly engaged with a gear 91 fixedly secured to the other end portion (in FIG. 1, the right end portion) of the transmission shaft 46a through an idler gear (not shown). Further, the carrier 44 is supported on the periphery of the sleeve 89 through a circular-ring-shaped coupling bracket 101 in such a manner that it can be rotated synchronously with the sleeve 89. Therefore, as the output side disks 4, 4 are rotated, the carrier 44 can be rotated in the opposite direction to these output side disks 4, 4 at a speed corresponding to the number of teeth formed in the respective gears 12b, 88, 90, 91. Also, between the carrier 44 and output shaft 40a, there is interposed a low speed clutch 51a.

Figure 4:
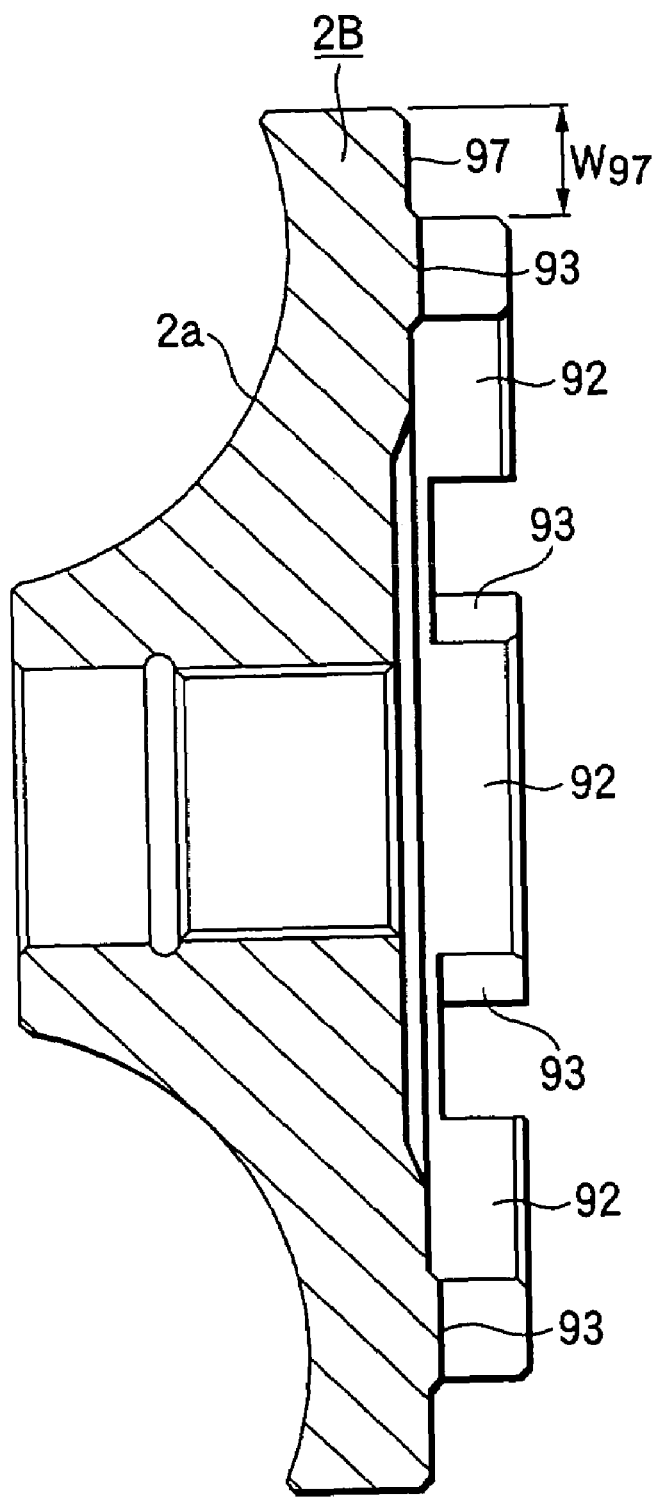
FIG. 4 is a section view of an input side disk used to transmit torque between a transmission shaft and itself, showing a state thereof in which it is viewed from the same direction shown in FIG. 1.
Figure 5:
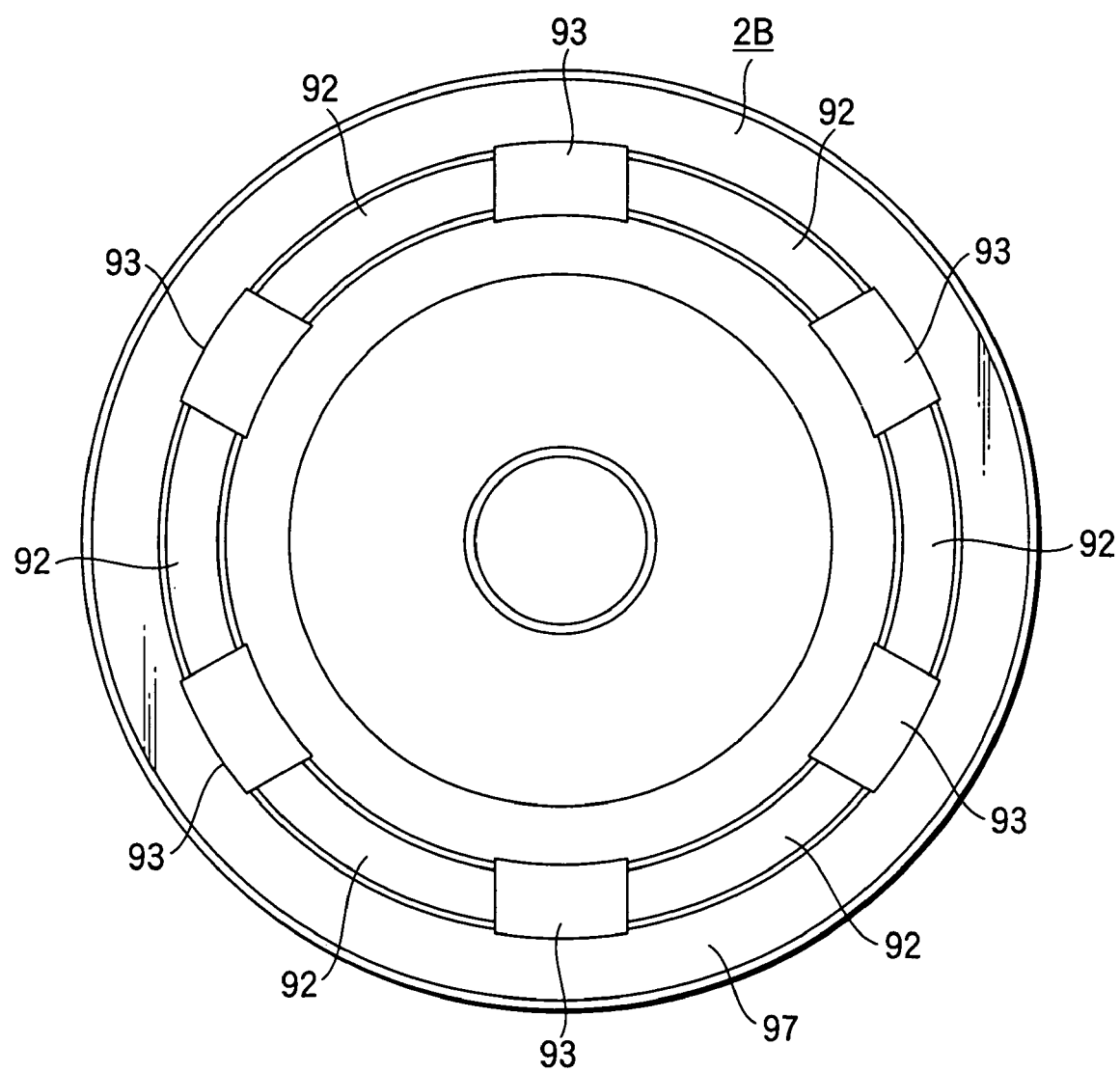
FIG. 5 is a view of the input side disk, showing a state thereof in which it is viewed from the right side of FIG. 4.

On the other hand, the input shaft 11b and ring gear 32 are connected to each other through the input side disk, 2B supported on the, leading end portion of the input shaft 11b and a transmission shaft 34a disposed concentrically with the input shaft 11b in such a manner that the rotation power can be transmitted between them. To attain this arrangement, in a portion of the outer surface (in FIGS. 1 and 2) of the input side disk 2B that is situated in a half section nearer to the outside diameter than the central portion of the present outer surface, as shown in FIGS. 4 and 5, there are projectingly provided a plurality of projecting portions 92, 92. In the present embodiment, these projecting portions 92, 92 are respectively formed in an arc shape and are arranged intermittently and at regular intervals on the same arc with the center axis of the input side disk 2B as a center thereof. And, the intermediate portions between the circumferential-direction end faces of the projecting portions 92, 92, which adjoin each other in the circumferential direction of the same arc, are formed as securing notches 93, 93. In other words, by cutting and removing short cylindrical portions provided on and projected from the outer surface of the input side disk 2B, the securing notches 93, 93 are formed and the intermediate portions between the securing notches 93, 93, which adjoin each other in the circumferential direction of the same arc, are formed as the projecting portions 92, 92.

On the hand, on the base end portion of the transmission shaft 34a serving as a transmission member, there is disposed a transmission flange 95 through a conically cylindrical-shaped transmission cylinder portion 94. And, in the outer periphery edge portion of the transmission flange 95, there are formed the same number of transmitting projection pieces 96, 96 as the securing notches 93, 93 at regular intervals with respect to the circumferential direction of the transmission shaft 34a. And, these transmitting projection pieces 96, 96 are respectively engaged with their associated securing notches 93, 93, thereby allowing torque to be transmitted between the input side disk 2B and transmission shaft 34a. The diameter of the engaged portions between the transmitting projection pieces 96, 96 and securing notches 93, 93 is set sufficiently large and, for this reason, sufficiently large torque can be transmitted between the input side disk 2B and transmission shaft 34a.

By the way, in order to increase the torque, which can be transmitted between the input side disk 2B and transmission shaft 34a, as much as possible, preferably, the projecting portions 92, 92 may be formed in the near-to-outside-diameter end portion (outer periphery edge potion) of the outer surface of the input side disk 2B. However, in case where the projecting portions 92, 92 are formed in the near-to-outside-diameter end portion (outer periphery edge potion) of the outer surface of the input side disk 2B, it is difficult to secure the finishing accuracy of the inner surface 2a of the input side disk 2B. That is, in the case of the inner surface 2a which is rollingly contacted with the peripheral surface 9a of the power roller 9 to thereby transmit torque, the shape and dimension accuracy thereof must be finished strictly. The finishing working of the inner surface 2a is carried out in such a manner that, while supporting the outer surface of the input side disk 2B, a grindstone is strongly pressed against the inner surface 2a. In this working operation, in order not only to restrict the elastic deformation of the input side disk 2B but also to finish the shape and dimension accuracy of the inner surface 2a strictly, it is necessary to support the near-to-outside-diameter portion of the outer surface of the input side disk 2B.

To attain the above purpose, in the near-to-outside-diameter portion of the outer surface of the input side disk 2B that is situated in the outer peripheral surfaces of the respective projecting portions 92, 92, for example, there is formed a flat portion 97 having a width $W_{97}$ of 10 $_{mm}$ or more in the diameter direction thereof and, in the above finishing working operation, the flat portion 97 is used to support the near-to-outside-diameter portion of the outer surface of the input side disk 2B. Also, the length of the respective transmitting projection pieces 96, 96 in the circumferential direction is set as near as possible to the width of the securing notches 93, 93 in the circumferential direction, so that the transmitting projection pieces 96, 96 can be respectively engaged into their associated securing notches 93, 93 with no play between them.

Also, the leading end portion (in FIG. 1, the right end portion) of the transmission shaft 34a is rotatably supported on the central portion of the sun gear 41. Further, on the periphery of the middle portion of the transmission shaft 34a, there is supported the ring gear 32 through a circular-ring-shaped coupling bracket 98 and a high speed clutch 35a (which will be discussed later) in such a manner that it can be rotated synchronously with the transmission shaft 34a. Therefore, when the high speed clutch 35a is connected, according as the input shaft 11b is rotated, the ring gear 32 is rotated in the same direction and at the same speed as the input shaft 11b.

Also, the present continuously variable transmission apparatus includes a clutch mechanism which constitutes a mode switching mechanism. This clutch mechanism comprises the above-mentioned clutch 35a, the above-mentioned low speed clutch 51a, and a backing clutch 52a interposed between the ring gear 32 and a fixed portion such as a fixed wall 99 formed within the housing of the continuously variable transmission apparatus. These clutches 35a, 51a and 52a are all wet-type multi-plate clutches and can be cut and connected in accordance with the supply and discharge of pressure oil with respect to the interior of oil pressure cylinders respectively attached to the clutches. Also, in case where any one of these clutches is connected, the connection or the remaining two clutches is cut.

In the above structured continuously variable transmission apparatus, firstly, in the low speed running operation, power transmission is carried out in a first mode; the low speed clutch 51a is connected and, at the same time, the connection of the high speed clutch 35a and backing clutch 52a is cut. In this state, in case where the input shaft 11b is rotated, only the toroidal-type continuously variable transmission 30a is allowed to transmit power from the input shaft 11b to the output shaft 40a. That is, in this state, the rotational movement of the output gear 12b of the toroidal-type continuously variable transmission 30a is transmitted through the first power transmission mechanism 45a to the carrier 44. Due to connection of the low speed clutch 51a, the rotational movement of the carrier 44, as it is, is transmitted to the output shaft 40a, so that the output shaft 40a with the sun gear 41 fixed thereto is rotated. In such low speed running operation, a transmission ratio between the pair of input side disks 2A, 2B and the pair of output side disks 4, 4 is controlled similarly to such a case using a single toroidal-type continuously variable transmission as shown in FIG. 13 which has been previously discussed herein. By the way, the low speed clutch need only be able to prevent the gears 32, 41, 42a, 42b from displacing with respect to each other and thus, the low speed clutch need not be always interposed between the carrier 44 and output shaft 40a.

However, in the case of the continuously variable transmission apparatus according to the present embodiment, since the power rollers 9, 9 are interposed by threes between the pair of input side disks 2A, 2B and the pair of output side disks 4, 4 in each cavity, that is, a total of six power rollers 9, 9 are interposed, the power to be transmitted by each of the power rollers 9, 9 can be reduced down to a low amount. Thanks to this, even in case where the surface pressure in the contact portions between the inner surfaces 2a, 4a of the disks 2A, 2B, 4 and the peripheral surfaces 9a, 9a of the power rollers 9, 9 is lowered, the power transmission can be attained without causing any slippage in the contact portions. By the way, the adjustment of the surface pressure of the respective contact portions can be made easily and positively by controlling the oil pressure that is introduced into the pressing device 36a of an oil pressure type. And, because the surface pressure of the respective contact portions can be reduced down to a low amount, the rolling fatigue lives of the respective surfaces 2a, 4a, 9a can be enhanced. Also, in case where the rolling fatigue lives of the respective surfaces 2a, 4a, 9a are unchanged, greater power can be transmitted.

On the other hand, in the high speed running operation, the power transmission is carried out in a second mode; the high speed clutch 35a is connected, whereas the connection of the low speed clutch 51a and backing clutch 52a is cut. In this state, in case where the input shaft 11b is rotated, the second power transmission mechanism 53 including the transmission shaft 34a and the planetary gear mechanism 31a transmit power from the input shaft 11b to the output shaft 40a. That is, in case where the input shaft 11b is rotated in the high speed running operation, the rotation power of the input shaft 11b is transmitted to the ring gear 32 through the transmission shaft 34a, coupling bracket 98 and high speed clutch 35a. And, the rotation power of the ring gear 32 is transmitted to the sun gear 41 through the plurality of planetary gear sets 43, 43, which rotates the output shaft 40a with the sun gear 41 fixed thereto. In this state, in case where the transmission ratio of the toroidal-type continuously variable transmission 30a is changed to thereby change the revolving speed (around the periphery of the sun gear 41) of the respective planetary gear sets 43, 43, the transmission ratio of the whole of the present continuously variable transmission apparatus can be controlled.

That is, in the high speed running time, the respective planetary gear sets 43, 43 are rotated around the periphery of the sun gear 41 in the same direction to the ring gear 32. And, the slower the above rotation speed of the planetary gear sets 43, 43 is, the faster the rotation speed of the output shaft 40a with the sun gear 41 fixed thereto. For example, in case where the above rotation speed of the planetary gear sets 43, 43 is equal to the rotation speed of the ring gear 32 (both are angular speeds), the ring gear 32 and output shaft 40a are equal in the rotation speed to each other. Also, in case where the above rotation speed of the planetary gear sets 43, 43 is slower than the rotation speed of the ring gear 32, the rotation speed of the output shaft 40a is faster than the rotation speed of the ring gear 32. On the other hand, in case where the above rotation speed of the planetary gear sets 43, 43 is faster than the rotation speed of the ring gear 32, the rotation speed of the output shaft 40a is slower than the rotation speed of the ring gear 32.

Therefore, in the high speed running operation, as the transmission ratio of the toroidal-type continuously variable transmission 30a is changed more toward the speed reducing side, the transmission ratio of the whole of the continuously variable transmission apparatus is changed more toward the speed increasing side. In such high speed running state, to the toroidal-type continuously variable transmission 30a, there is applied torque not from the input side disks 2A, 2B but from the output side disks 4, 4 (assuming that torque to be applied in the low speed running state is positive torque, negative torque is applied in the high speed running state).

That is, in a state in which the high speed clutch 35a is connected, the torque transmitted to the input shaft 11b is transmitted through the transmission shaft 34a to the ring gear 32 of the planetary gear mechanism 31a. Therefore, there hardly exists the torque that is transmitted from the input shaft 11b side to the input side disks 2A, 2B.

On the other hand, part of the torque transmitted to the ring gear 32 of the planetary gear mechanism 31a through the second power transmission mechanism 53 is transmitted from the respective planetary gear sets 43, 43 through the carrier 44 and first power transmission mechanism 45a to the output side disks 4, 4. In this manner, the torque to be transmitted from the output side disks 4, 4 to the toroidal-type continuously variable transmission 30a decreases more as the transmission ratio of the toroidal-type continuously variable transmission 30a is changed more toward the speed reducing side so as to change the transmission ratio of the whole of the continuously variable transmission apparatus toward the speed increasing side. As a result of this, by reducing the torque to be input to the toroidal-type continuously variable transmission 30a in the high speed running operation, the durability of the composing parts of the present toroidal-type continuously variable transmission 30a can be enhanced. Also, although power passing through the toroidal-type continuously variable transmission 30a varies in size in such high speed running operation as well, by adjusting the oil pressure to be introduced into the pressing device 36a, the surface pressure in the contact portions between the respective surfaces 2a, 4a, 9a can be set at a proper value.

Further, to rotate the output shaft 40a reversely so as to back a vehicle, power transmission is carried out in a third mode; that is, the connection of both of the low speed and high speed clutches 51a, 35a is cut and the backing clutch 52a is connected. As a result of this, the ring gear 32 is fixed and, at the same time, the respective planetary gear sets 43, 43, while they are meshingly engaged with the ring gear 32 and sun, gear 41, are rotated around the periphery of the present sun gear 41. And, the sun gear 41 and the output shaft 40a with the sun gear 41 fixed thereto are rotated in the opposite direction to the previously described low speed running operation and the last mentioned high speed running operation.

By the way, when using the continuously variable transmission apparatus according to the invention as an automatic transmission for a vehicle, between an engine serving as a drive source and the input shaft 11b, there is interposed a torque converter or a start clutch such as an electromagnetic clutch. However, alternatively, the low speed clutch 51a may be arranged so as to have the function of a start clutch and thus an independent start clutch can be omitted. In this case, while the vehicle is stopping, the connection of not only the low speed clutch 51a but also the high speed clutch 35a and backing clutch 52a is cut. In this state, the toroidal-type continuously variable transmission 30a and first and second power transmission mechanisms 45a, 53 idle, so that no power is transmitted to the output shaft 40a. From this state, in case where the low speed clutch 51a is connected gradually, the stopping vehicle can be started smoothly.

Also, in the illustrated embodiment, since it is assumed that the continuously variable transmission apparatus according to the invention is used as an automatic transmission for a vehicle, there are disposed the high speed, low speed and backing clutches 35a, 51a, and 52a. On the other hand, in case where the continuously variable transmission apparatus according to the invention is used, for example, as a transmission for controlling the operating speeds of various industrial machines such as a pump while the operating speed of a drive source remains constant, the present continuously variable transmission apparatus may be operated only in the above-described high speed running operation. Therefore, when the continuously variable transmission apparatus according to the invention is used in such use, the transmission shaft 34*a* and ring gear 32 respectively shown in FIG. 1 are connected and fixed to each other in such a manner that they can be rotated synchronously (not through the high speed clutch 35*a*). Also, there are omitted the low speed clutch 51*a* used to realize the locked state of the planetary gear mechanism 31*a* and the backing clutch 52*a* for fixing the ring gear 32 to the casing 5*a*.

Since the invention is structured and operates in the above-mentioned manner, there can be provided a structure capable of large torque transmission between the composing members thereof without increasing the size of a toroidal-type continuously variable transmission or a continuously variable transmission apparatus incorporating such toroidal-type continuously variable transmission therein. Thanks to this, there can be realized a toroidal-type continuously variable transmission and a continuously variable transmission apparatus which are capable of large power transmission, are more excellent in durability, are compact in size, and are light in weight.

What is claimed is:

1. A toroidal-type continuously variable transmission, comprising:
    an input shaft;
    an input side disk including an inner surface and rotatable integrally with said input shaft;
    an output side disk including an inner surface, disposed coaxially with said input side disk, and rotatable independently of said input shaft;
    a plurality of trunnions interposed between said input side and output side disks and swingable about respective pivot shafts placed at twisted positions with respect to center axes of said input side and output side disks;
    a plurality of displacement shafts respectively projected out from inner surfaces of associated ones of said plurality of trunnions;
    a plurality of power rollers held by and between said inner surfaces of said input side and output side disks in such a manner that they can be rotatably supported on associated ones of said plurality of displacement shafts; and,
    a transmission member including a plurality of transmitting projection pieces on the base end portion thereof, wherein said projection pieces of said transmission member are fixed in an axial direction of the input side disk,
    wherein a plurality of projecting portions are provided on and projected from part of an outer surface of said input side disk, and said transmitting projection pieces of said transmission member are engaged with said projecting portions to thereby be able to transmit torque between said input side disk and said transmission member, wherein said projecting portions are slidable, in the axial direction of the input side disk, with respect to said projection pieces.

2. The toroidal-type continuously variable transmission as set forth in claim 1, wherein said transmitting projection pieces are provided on a transmission flange disposed on said transmission member at regular intervals with respect to a circumferential direction of said transmission flange.

3. The toroidal-type continuously variable transmission as set forth in claim 1, wherein said projecting portions of said input side disk are provided on and projected from a portion of said outer surface of said input side disk that is placed nearer to an outside diameter thereof than a central portion thereof.

4. The toroidal-type continuously variable transmission as set forth in claim 2, wherein the plurality of projection portions comprises more than 3 projection portions.

5. The toroidal-type continuously variable transmission as set forth in claim 3, wherein flat portions are provided on the surface of the input side disk and are situated adjacent to respective outer peripheral surfaces of the projecting portions.

6. The toroidal-type continuously variable transmission as set forth in claim 1, wherein the cross sections of said projecting portions are rectangular.

7. A continuously variable transmission apparatus, comprising:
    an input shaft;
    an output shaft for taking out power based on the rotation of said input shaft;
    a toroidal-type continuously variable transmission;
    a planetary gear mechanism;
    a first power transmission mechanism for transmitting power input to said input shaft through said toroidal-type continuously variable transmission; and
    a second power transmission mechanism for transmitting the power input to said input shaft not through said toroidal-type continuously variable transmission,
    said toroidal-type continuously variable transmission, comprising:
    a pair of input side disks each including an inner surface, respectively supported on two end portions of said input shaft, and rotatable as said input shaft is rotated;
    a pair of output side disks each including an inner surface, and respectively disposed on a periphery of a middle portion of said input shaft in such a manner that they are coaxial with said input side disks with their respective inner surfaces opposed to said inner surfaces of said input side disks, said output side disks being rotatable independently of and synchronously with said input side disks;
    a plurality of trunnions interposed between said input side and output side disks and swingable about respective pivot shafts placed at twisted positions with respect to center axes of said input side and output side disks;
    a plurality of displacement shafts respectively projected out from inner surfaces of associated ones of said plurality of trunnions;
    a plurality of power rollers held by and between said inner surfaces of said input side and output side disks in such a manner that they can be rotatably supported on associated ones of said plurality of displacement shafts, and;
    a pressing device disposed on a periphery of said input shaft in parallel to said input shaft with respect to a power transmission direction for applying a force, with which said input side and output side disks hold said power rollers based on oil pressure, in correspondence to a size of power to be transmitted between said input side and output side disks,
    said planetary gear mechanism comprising:
    a sun gear;
    a ring gear disposed on a periphery of said sun gear;
    a planetary gear rotatably interposed between said sun gear and said ring gear and meshingly engageable with said sun gear and said ring gear; and,
    a carrier for supporting said planetary gear, wherein said second power transmission mechanism includes a transmission shaft, said transmission shaft includes a plurality of transmitting projection pieces extending outwardly in a diameter direction thereof from an end portion thereof, a plurality of projecting portions are provided on part of an outer peripheral surfaces of said input side disks, power to be transmitted through said first power transmission mechanism and power transmitted through said second power transmission mechanism can be transmitted to two of said sun gear, said ring gear and said carrier, said output shaft is connected to the remaining one of said sun gear, said ring gear and said carrier, and said transmitting projection pieces of said transmission shaft are engaged with said projecting portions of said input side disks to thereby be able to transmit a rotational force from said input side disks to said transmission shaft.

8. The continuously variable transmission apparatus as set forth in claim 7, further comprising:

a drive shaft disposed concentrically with said input shaft and having a plurality of driving projection portions in an end portion thereof, wherein an outwardly-facing flange portion is disposed on an outer peripheral surface of an end portion of said input shaft, a plurality of notches are in an outer peripheral edge portion of said flange portion, and said driving projection portions of said drive shaft are respectively engaged with said notches of said input shaft, whereby allowing said drive shaft to drive and rotate said input shaft.

9. The continuously variable transmission apparatus as set forth in claim 7, further comprising:

a mode switching mechanism for switching a mode of transmitting power input into said input shaft to said planetary gear mechanism through said first and second power transmission mechanisms, wherein said mode switching mechanism is capable of switching the following three modes over to one another: that is, a first mode of transmitting said power only using said first power transmission mechanism; a second mode of transmitting said power using both of said first and second power transmission mechanisms; and, a third mode of not only transmitting said power only using said first power transmission mechanism but also reversing a rotation direction of said output shaft with respect to said first and second modes.

* * * * *